United States Patent [19]

Milligan

[11] E

Patent Number: Re. 33,404

[45] Reissued Date of Patent: Oct. 23, 1990

[54] ENHANCED DISTANCE DATA TRANSMISSION SYSTEM

[75] Inventor: James H. Milligan, Shoreview, Minn.

[73] Assignee: Megabit Communications, Inc., Little Canada, Minn.

[21] Appl. No.: 303,631

[22] Filed: Jan. 27, 1989

Related U.S. Patent Documents

Reissue of:

[64] Patent No.: 4,642,629
Issued: Feb. 10, 1987
Appl. No.: 596,858
Filed: Apr. 9, 1984

U.S. Applications:

[63] Continuation-in-part of Ser. No. 486,427, Apr. 18, 1983, abandoned.

[51] Int. Cl.[5] ..... H04Q 1/00

[52] U.S. Cl. ..... 340/825; 340/825.03; 340/825.57

[58] Field of Search ..... 340/825.57, 825.03, 340/825.05, 825.07, 825.21, 825, 825.5; 370/15, 60, 61, 64, 79, 82, 85, 86, 94; 375/8, 9, 52; 178/2 D; 371/24, 11

[56] References Cited

U.S. PATENT DOCUMENTS

| | | |
|---|---|---|
| 3,909,526 | 9/1975 | Fretwell . |
| 4,010,450 | 3/1977 | Porter . |
| 4,058,681 | 11/1977 | Imaizumi . |
| 4,074,236 | 2/1978 | Ishida . |
| 4,187,394 | 2/1980 | Sievers . |
| 4,205,200 | 5/1980 | Parikh . |
| 4,259,663 | 3/1981 | Gable . |
| 4,325,147 | 4/1982 | Rothlauf . |
| 4,366,478 | 12/1982 | Masuda . |
| 4,367,549 | 1/1983 | Vachee . |
| 4,380,063 | 4/1983 | Janson . |
| 4,413,337 | 11/1983 | Dauphin . |
| 4,423,414 | 12/1983 | Bryant . |
| 4,488,298 | 12/1984 | Bond . |
| 4,510,492 | 4/1985 | Mori . |
| 4,514,823 | 4/1985 | Mendelson . |

FOREIGN PATENT DOCUMENTS

| | | |
|---|---|---|
| 1123962 | 5/1982 | Canada . |
| 0060751 | 9/1982 | European Pat. Off. . |

OTHER PUBLICATIONS

Pp. 262 through 265 from "Digest of Papers Compcon '79 Spring", showing ©1979, containing article by James E. Thornton entitled Overview of Hyperchannel.

(List continued on next page.)

OTHER PUBLICATIONS

Pp. 10 through 17 from Feb. 1980 issue of Computer containing article by James E. Thornton entitled "Back--End Network Approaches".

IBM Technical Disclosure Bulletin vol. 19, No. 8, Jan. 1977, pp. 3139–3143, authored by Lynch and Thorne.

IBM Technical Disclosure Bulletin vol. 24, No. 4 of Sep. 1981, pp. 1850, 1851.

4 pages reprinted from Feb. 1979 issue of Telecommunications, containing article by Gary S. Christensen entitled "Links Between Computer-Room Networks".

"Optical Data Mux", by A. Miyata et al., pp. 13–24 of Fujitsu, vol. 32, No. 5, Sep. 1981, plus a partial translation.

"High Speed Dedicated Network", by K. Satoh et al., pp. 35–40 of Fujitsu, vol. 32, No. 6, Oct. 1981, plus a partial translation.

*Primary Examiner*—Ulysses Weldon
*Attorney, Agent, or Firm*—Baker, Robert C.

[57] ABSTRACT

A logic system between parallel channel end devices such as a computer and peripheral device. A level converter converts parallel digital signals from the external devices to levels for the system. A comparator samples the converted levels. Multiplex serialization of the parallel signals is initiated by comparator action and proceeds under count control. Sampled converted levels are also used to generate mode signals which are used to select predetermined logic patterns within the system, and to select varied lengths of count for messages serialized for transmission from one end of the logic system to the other. The serialized messages received at the other end are converted to parallel form by a shift register under count action governed by the mode of transmission. A sampling of the mode intelligence transmitted is used to set the receiving end in the same mode as the sending end. Buffer registers are provided for temporary storage of received messages. Special circuitry is adapted to generate signals from outputs of the external devices and turn those signals back to the external devices to enhance rapid data transfer. And logic circuitry is employed which provided the sending end of the system with intelligence on the availability of buffer storage space at the receiving end.

34 Claims, 11 Drawing Sheets

FIG. 7
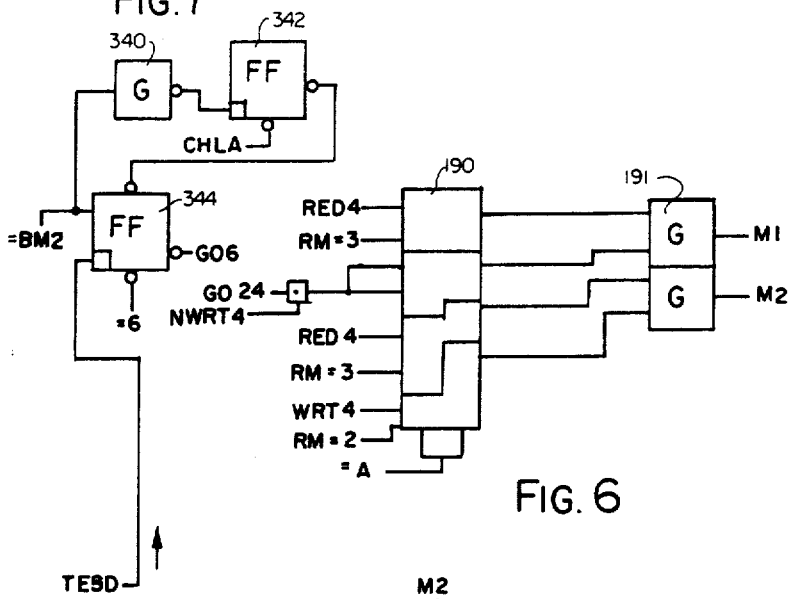
FIG. 6
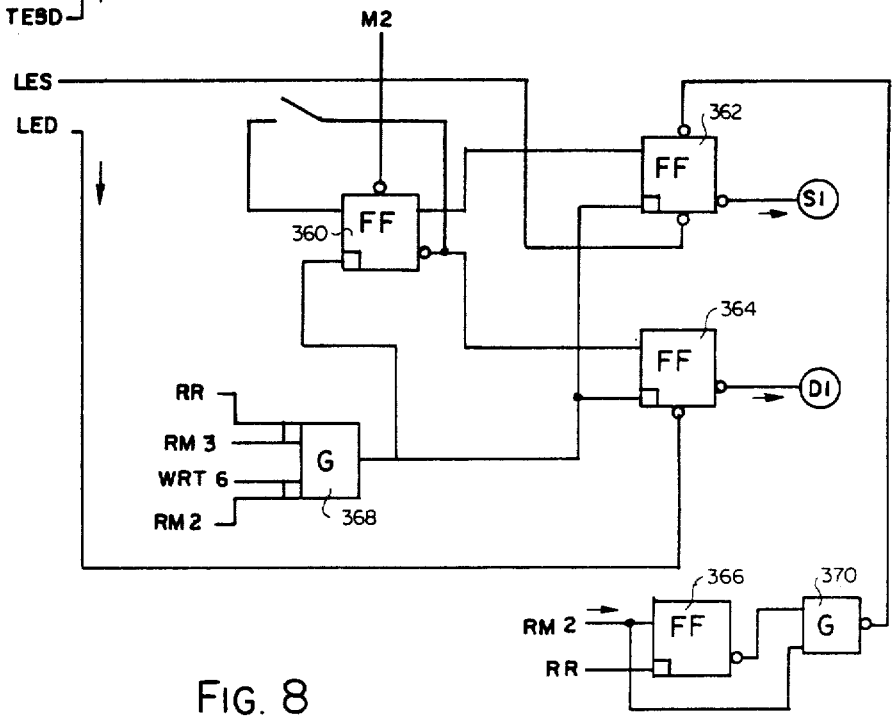
FIG. 8

ENHANCED DISTANCE DATA TRANSMISSION SYSTEM

Matter enclosed in heavy brackets [ ] appears in the original patent but forms no part of this reissue specification; matter printed in italics indicates the additions made by reissue.

This *application* is *for Reissue of my Pat. No. 4,642,629, issued Feb. 10, 1987 on my application Ser. No. 596,858 filed Apr. 9, 1984 as* a continuation-in-part of my application Ser. No. 486,427, filed Apr. 18, 1983 now abandoned.

BACKGROUND OF THE INVENTION

1. Field of the Invention

This invention relates generally to electronic data processing, and pertains more particularly to a system for transmitting digital data over a longer distance than conventional data channels permit. In its most preferred form, this invention contemplates temporary storage of data and special logic to control or facilitate passage of the same to an external device.

2. Description of the Prior Art

Conventional wired data channels vary in length, the length usually being limited to a maximum of about 200 feet. Basically, the distance must be relatively short owing to two factors: (1) circuit limitations and (2) timing limitations.

(1) Circuit limitations occur from the attenuation of a signal as it progresses over a long wire, and also from skewing wherein several signals propagating in parallel may not reach their destination simultaneously.

(2) Timing limitations, on the other hand, result from the adoption of short propagation intervals. More specifically, where a set of signals must first propagate the entire length of a wire channel and a response signal propagate back over a second wire channel before further transmission can take place, the sum of these propagation times becomes greater than the interval at which the peripheral unit must be responded to, and a loss of data results.

Serialization of the data transmission has been a step in the proper direction as far as reducing the above-mentioned circuit limitations. Also, as far as parallel lines are concerned, channel extenders have been devised, these being long line drivers without utilizing serialization; but use of these results in a slowdown of data transfer which can trigger an error condition in a time sequence of demand receiver.

SUMMARY OF THE INVENTION

My invention provides a system for transmitting or transferring digital data over relatively long distances, easily on the order of 0.6 kilometers (2000 feet), and even longer distances, using conducting means, or even radio transmission, if desired. Circuit limitations herein before mentioned are minimized by serializing the data so that all data travels sequentially or over the same path, and preferably by additionally employing suitable modulation techniques to enable the receiver to react to small amplitude signals. In this latter regard, it is preferred that phase modulation be utilized; however, other modulation techniques can be employed depending on the media of transmission.

In overcoming time constrains that have been alluded to, a preferred aspect of the invention is to enable transfer of data in the absence of a reply acknowledgment from an external receiver. In this regard, it is within the purview of my invention to employ buffered data banks at the receiving end which function as a temporary storage medium before the data is passed to an external receiver. Further, it is within the purview of my invention to generate reply acknowledgment signals for operation of an external sender and to do that entirely within my logic system.

The invention provides logic circuitry that can be incorporated into and used with data processing equipment currently on the market and which equipment need not actually be modified to any degree in order to benefit from the teachings of my invention. Also, the invention preserves system integrity, enabling the transfer of digital data from one vantage point to another without loss or sacrifice of reliability.

Briefly, my invention envisages the conversion of the data pulses from a conventional computer to pulses having different and more readily processed voltages. After multiplexing to provide serialization of the digital data, the pulses are phase-modulated and then forwarded over a first transmission conduit (e.g., channel) to a receiving station located at a vantage point that can be significantly farther away from the computer end of the transmission than possible heretofore. At the receiving station or end of my logic, I employ a phase demodulator and a means for changing the serially received data back to its original form, both as to amplitude and parallelism.

Buffered storage in the form of a plurality of shift or buffer registers is provided, although such buffer storage can be by-passed when circumstances so dictate. These registers are controlled in a manner so that no data will be transmitted unless the registers at the receiving end of my logic can accommodate the data upon receipt. Only a two-bit code need be received before a signal is sent back to the transmitting end of my logic which causes what will be termed an implied acknowledgment signal to be generated, as may be necessary to satisfy the requirements for release of data by an external device at the sending end of my logic. The control circuitry for the buffer registers insures that data will be transmitted only as long as they are able to receive and handle such data.

Consequently, my system obviates the need for an external receiving device to send an acknowledgment signal indicating its receipt of data. Stated somewhat differently, as long as buffered space exists and can handle the transmitted data, data can continue to be transmitted without interruption or delay.

Further, a preferred but specialized aspect of my invention is that of reducing the number of bits in certain messages or internal acknowledgments transmitted, while at the same time generating at the receiving end the input to an external device of non-transmitted bits, thereby saving time.

Another preferred but specialized aspect of my invention is that of promptly modifying, under some conditions, some of the output signals of an exterior device (e.g., peripheral unit or computer) into signals accepted by the outputting exterior device, and then directing the modified signals back to the exterior device, without transmission between the exterior devices. This technique may be used at both ends and is preferably used where the controlled buffered storage of my invention is employed. It significantly enhances speed of data transfer. While the approach may be looked upon as causing a "lie" to be sent to the exterior devices, even a "lie" generated from their own output, the circuitry controls employed render any such "lie" innocuous and, in fact, highly beneficial in instances where the external device is programmed to require some input before it will release or accept data.

BRIEF DESCRIPTION OF THE DRAWING

FIG. 6 is a diagram illustrating parts of sending circuitry used in establishing the mode of data transmission;

FIG. 7 is a diagram of specialized circuitry for effecting a reduced bit or 6-bit transmission, particularly an acknowledgment;

FIG. 8 is a diagram of specialized circuitry operable under certain circumstances to create or generate a reply signal, or acknowledgment, or request, for an adjacent external device even though none is transmitted from the opposite end of my circuitry;

EXPLANATION OF DISCLOSURE FORMAT

Figure 1:
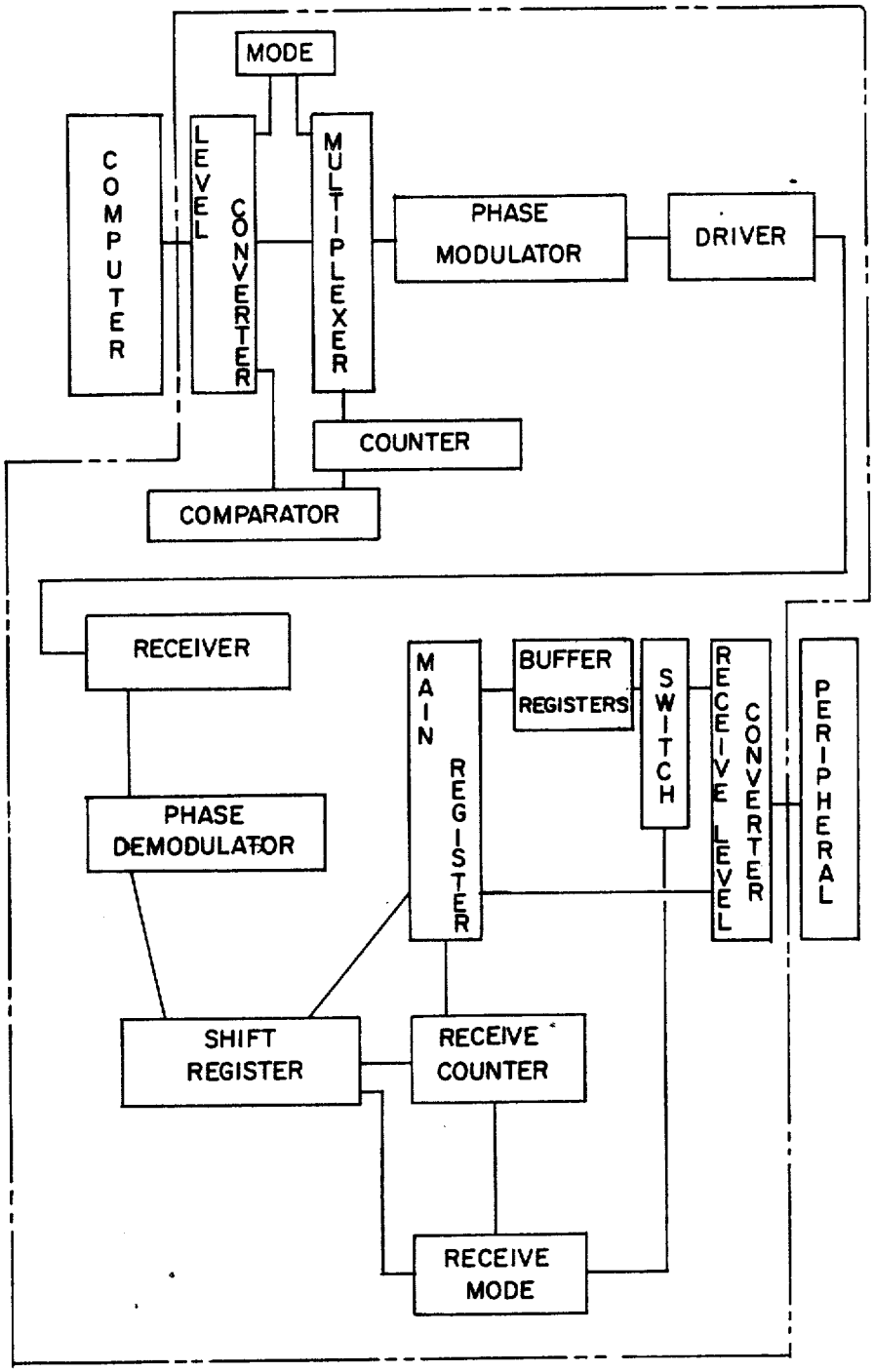
FIG. 1 is a simplified diagram depicting my logic circuitry within dashed lines, with elements of the sending logic circuitry in the upper part of the Figure and elements of the receiving logic circuitry in the lower part thereof, although preferred practice of my invention envisages both the sending and receiving circuitry as being present and selectively interconnected and used at both ends.

Symbols in the drawing are used for more ready comprehension of the logic of my circuitry; and a table of symbol definitions is set-forth in the next subsection of this specification. Capital alphabet letters and numbers below 100 are employed for symbol purposes, as well as combinations of capital letters and numbers.

Numbers 100 and higher, with or without low case alphabet letters following the number, are solely to key discussion in the specification to parts of the drawing.

Further, illustrative commercially available logic components will be set forth in the specification. They are intended solely to present full disclosure of an illustrative embodiment. Unless otherwise stated, all such references are to components available from Motorola, Inc., for example, as part of their MECL family described in their publication "The Semiconductor Library", Series A, Volume IV, copyright 1974, here incorporated by reference. For brevity, such references to Motorola's components will be placed in parentheses, thusly "(MC10101)", meaning Motorola's quad OR/-NOR gate MC10101.

However, my invention is not dependent on the specifics of the illustrated circuitry nor the specifics of the illustrated components. The essence of my invention is in the principles of the logic employed, including the broadest aspect thereof; and these logic principles, while discussed with reference to specific components and circuits, are not limited thereto. The principles of my logic can be implemented in circuits quite different from, and employing components different from, those illustrated, without departing from the broad essence of the teachings set forth herein.

In the most preferred use of my invention, the entire circuitry making up the logic for both sending and receiving is present in a box or assembly at each end of the conduit for transmission. For convenience, the sending and receiving logic at one end (e.g., adjacent a computer) can be referred to as the "A" end, whereas the assembly of sending and receiving logic at the other end (e.g., adjacent a peripheral device) can be referred to as the "B" end.

Within the internal logic of my illustrated specific embodiment, a digital zero is handled as a minus one volt, whereas a digital one is minus two volts. However, the principles of my logic may be employed with any other appropriate electronic significance for conveying the digital data.

As a convention in discussing the various modes of operation for my logic, the illustrated specific embodiment will refer to three different modes, explained as follows:

01 is Mode 1, where random messages and full multiplexing are used, e.g., for a 24-bit communication. This can be used for messages or acknowledgments both to and from each "external" device such as a computer and a peripheral device.

10 is Mode 2, where WRITE messages of, for example, 12 bits are sent internally within my logic system from the computer to the peripheral and 6-bit internal replies or acknowledgments are sent back.

11 is Mode 3, where READ messages (e.g., 12 bits) are sent internally within my logic system between external devices, for example, from a peripheral device to a computer.

Thus, while outgoing lines M1 and M2 in FIG. 6 may superficially suggest that Mode 1 per se arises from a signal on line M1, the fact is that the combination of the pulse voltage logic on lines M1 and M2 establishes the "Mode", including Mode 3, and the labeling is done solely for glance recognition.

My 6 and 12 bit messages may lack—or need not include—service and data signals. To satisfy the needs of the computer and peripheral devices which require those signals for operation, I use the smaller bit messages within my logic to generate appropriate service and data signals as may be required to satisfy the operation of the external devices.

TABLE OF SYMBOLS IN DRAWING

Not in limitation, but as an aid to understanding the Drawing, the following symbol definitions are offered. The symbols appearing in FIG. 2 will be first defined; the definition of symbols in subsequent drawings will be limited to those which are new over previously defined ones.

Throughout:

Arrows next to lines indicate direction of signal.

G within a box means the box is a "gate" of some type, explained in the specification.

FF within a box means the box is a flip-flop of some type, explained in the specification.

Figure 2:
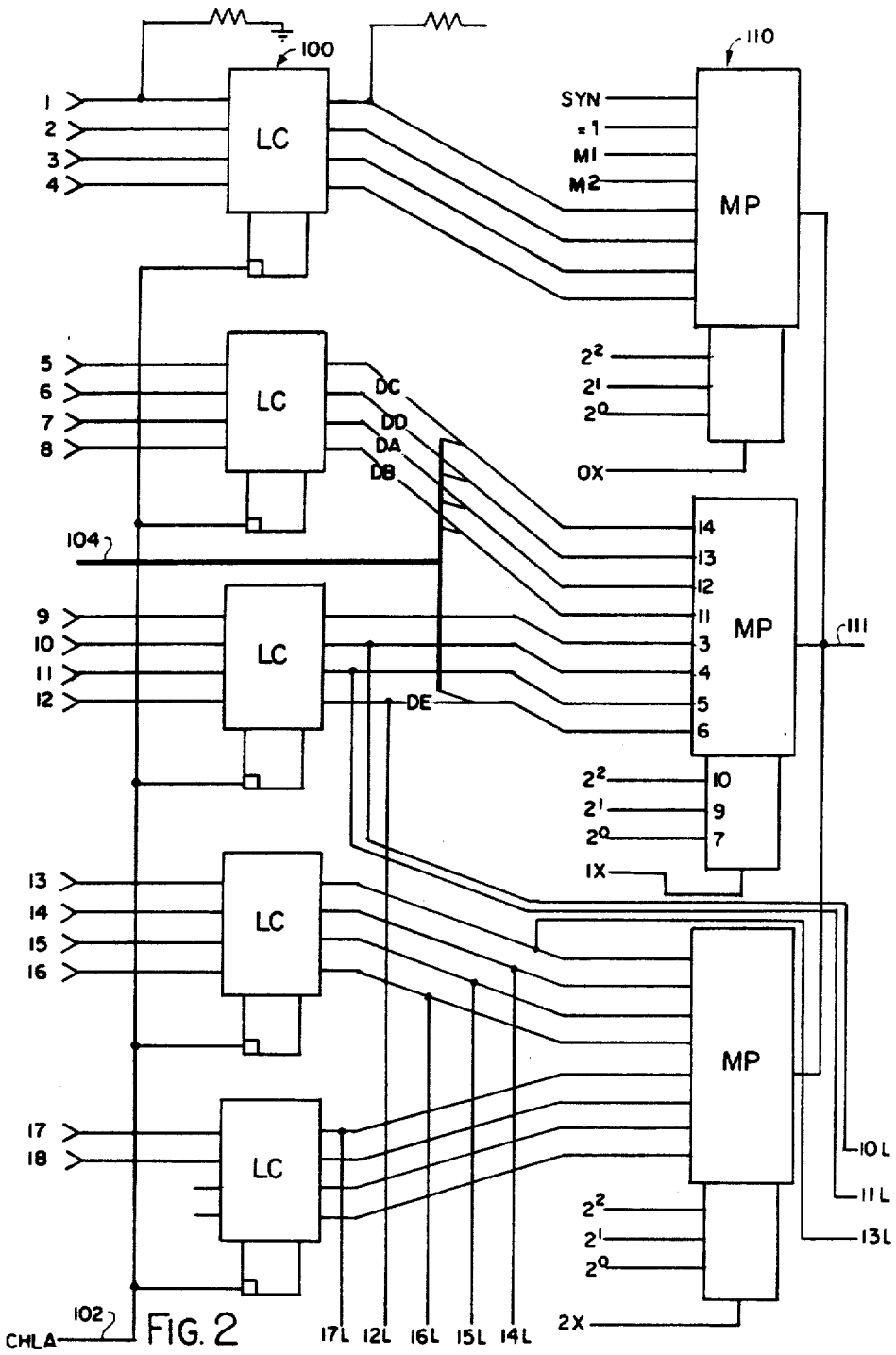
FIG. 2 is a detailed diagram showing parallel inputs from a sending device (e.g., computer) to converters LC and then to multiplexers MP.

In FIG. 2:

1 to 18, inclusive, signify parallel channel lines (e.g. from a computer). Illustratively, lines 1 through 9 can be considered BUS or data lines (with line 1 through 8 carrying data and line 9 a parity signal), whereas lines 10 through 18 can be considered TAG lines or lines carrying control signals (such as Service 10, Data 11, Command 12, and Suppress 16). (But at the peripheral, these lines would have complementary significance.)

LC is Level Converter.

DA, DB, DC, DD, and DE indicate BUS data plus one TAG line (e.g., Command 12) sampled after level conversion.

10L through 17L indicate TAG or control signals after level conversion.

SYN is a synchronization signal during non-message times. It is a repetitive 010101 at clock time.

=1 is a code signal of repetitive "2". In FIG. 2 its purpose is to signify start of a message.

M1 is a code signal of mode.

M2 is a code signal of mode. It together with M1 produces a two bit code for establishing mode.

MP is multiplexer.

Figure 3:
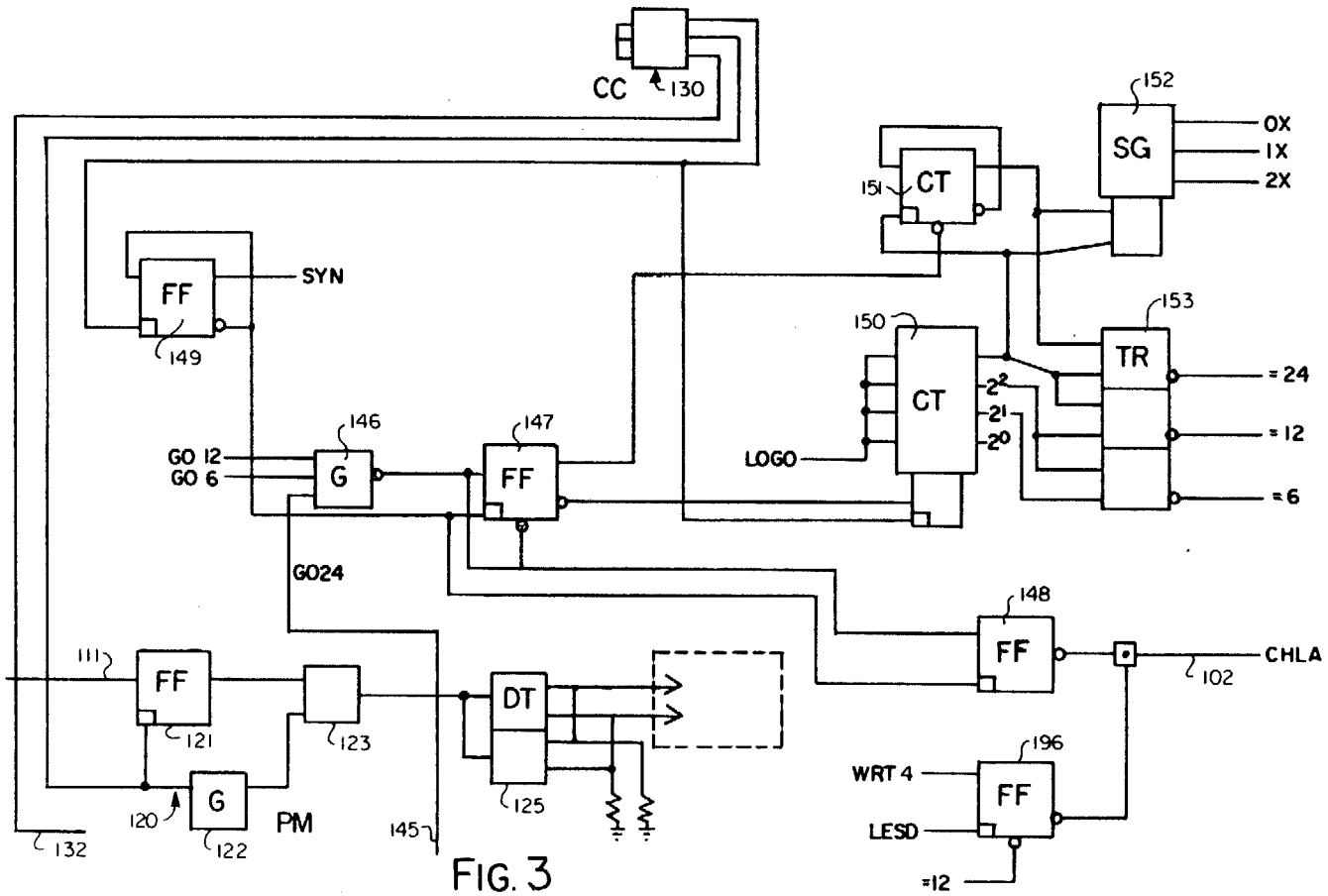
FIG. 3 is a diagram of a portion of sending circuitry, including a crystal clock CC, counting means CT, a phase modulator PM and driver for transmission DT.

0X, 1X and 2X and well as $2^0$, $2^1$, and $2^{32}$ are inputs to the multiplexers from control elements, namely, a counter CT and shift gate SG in FIG. 3.

CHLA means Channel Latch, a channel control signal.

In FIG. 3:

CC is Crystal Clock.

GD6; GO12, GO24 are signals for counts of b 6, 12 or 24 bits for serialization by the multiplexer.

=6, =12, =24 are signals indicating completion of the bit count (e.g., of serialization) to those respective numbers.

LOGO is a logical zero signal, a constant.

CT is Counter.

TR is Translator.

SG is Shift Gate.

PM is Phase Modulator.

DT is Driver for Transmission.

WRT4 indicates a signal in Mode 2, generated preliminarily in establishing the Mode 2 or WRITE condition for transmission.

Figure 4:
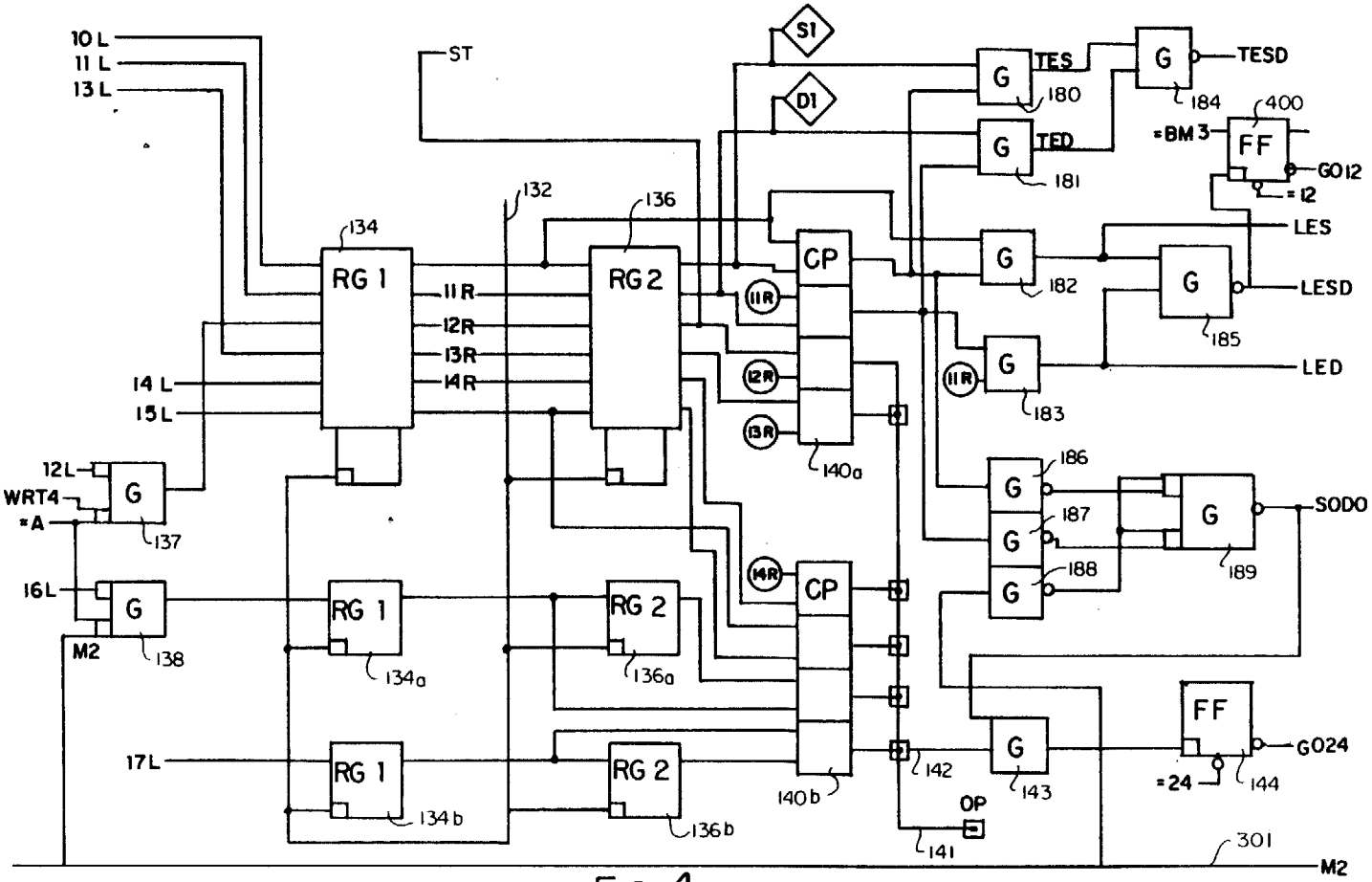
FIG. 4 is a diagram of a portion of sending circuitry, showing sample inputs 10L through 17L taken from FIG. 2, plus two banks of registers RG1 and RG2 and comparator means CP.

LESD is a signal, incoming here, representing the Leading Edge of Service of Data (see FIG. 4).

In FIG. 4:

=A signifies a line controlled by =A input, which may be either "true", in which case the input of =A puts the logic element in readiness for A end operation (e.g., adjacent a computer), or "false", in which case the logic element can be considered in readiness for B end operation (e.g., adjacent a peripheral device). My circuitry adjacent the computer is commonly referred to as "A" circuitry, whereas the opposite end of my circuitry next to the peripheral is called "B".

RG1 indicates register one, for first bank registers.

RG2 indicates second bank registers, containing sampled TAG or control signals one clock pulse behind RG1.

CP indicates comparator, for comparing the data in RG1 against RG2.

OP is Out Pulse of comparator CP.

11R through 14R simple represent code markings in FIG. 4 to connect lines respectively so marked.

Figure 11:
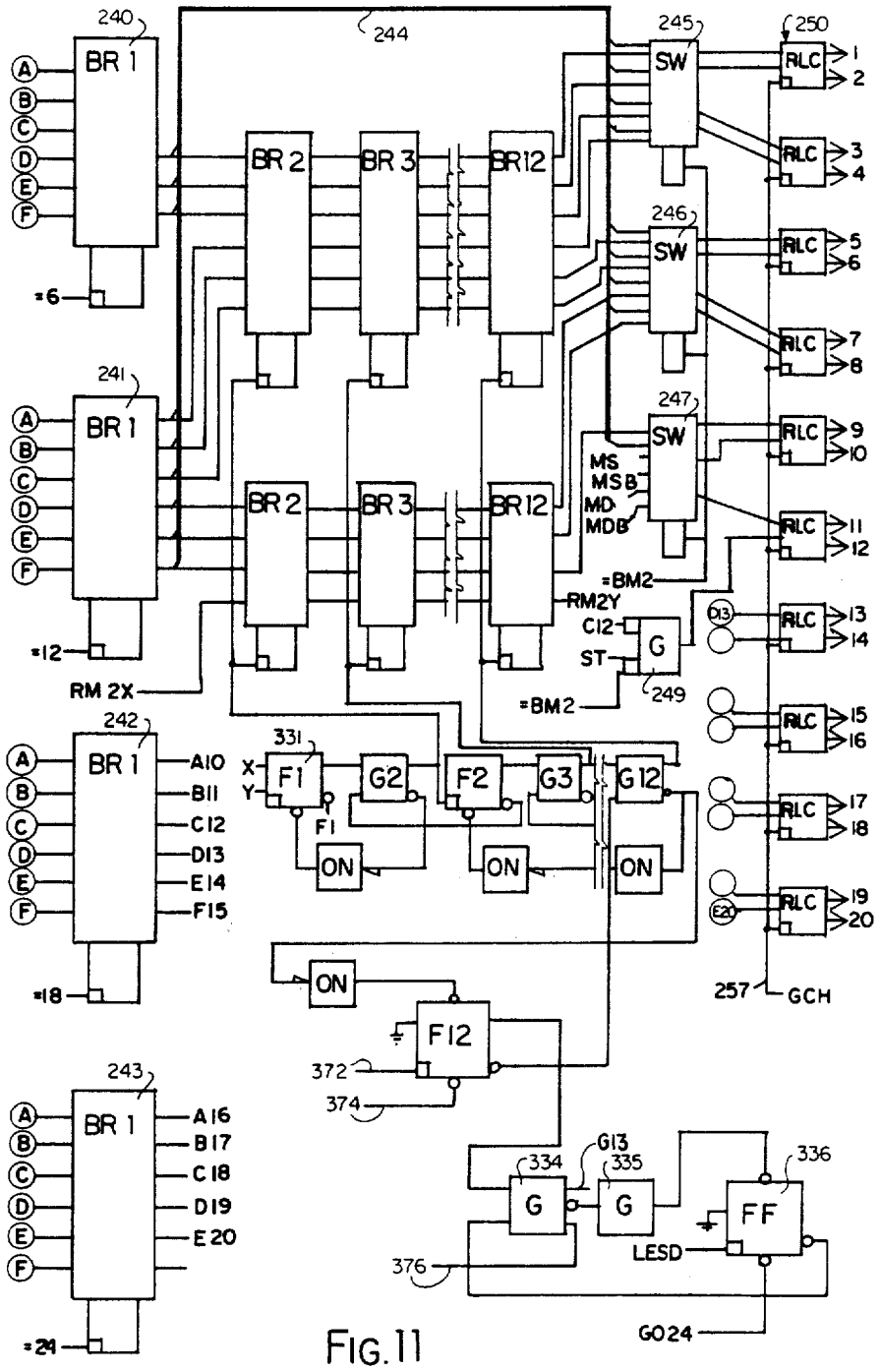
FIG. 11 is a diagram of my circuitry particularly operable for receiving, and illustrates a first or main bank of registers BR1, a plurality of banks of buffer registers (partially broken away to reduce duplication) labeled BR2, BR3 and BR12, and buffer register control inputs (partially broken away) labeled G2, G3, and G12.

ST is a "status" signal from the peripheral, e.g. "status in", taken off here for input in FIG. 11.

SI within the diamond means a Service In signal.

DI within the diamond means Data In signal.

TES is Trailing Edge of Service.

TED is Trailing Edge of Data.

LES is Leading Edge of Service.

LED is Leading Edge of Data.

TESD is Trailing Edge of Service or Data.

LESD is Leading Edge of Service or Data.

SODO is Service or Data. It is a pulse occurring on either the rise or fall of service or data, that is, on any edge of service or data, whether leading or trailing, out or in.

−BM3 is a signal of received Mode 3 operation at the B end.

Figure 5:
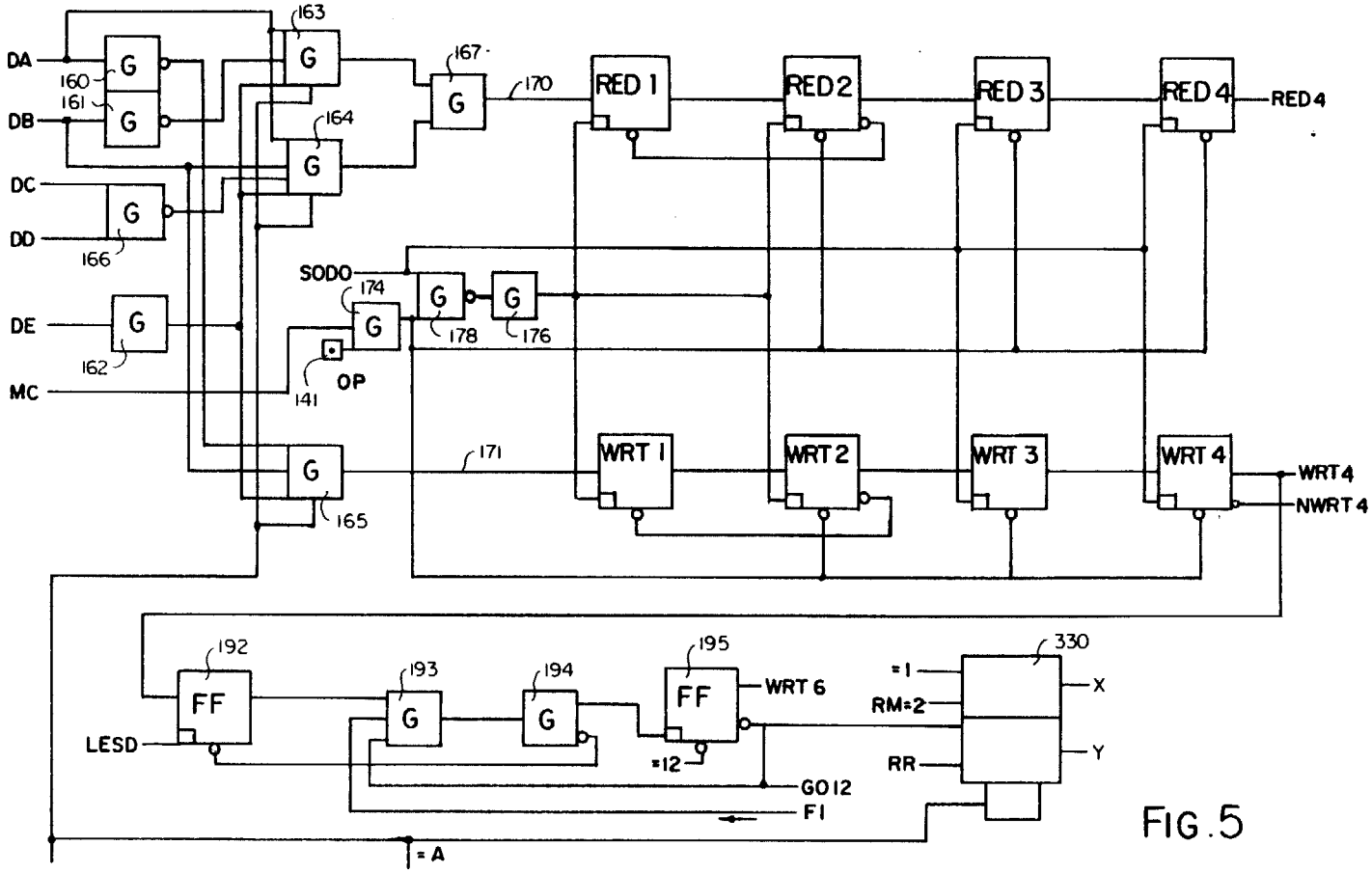
FIG. 5 is a diagram of a portion of sending circuitry, with DA through DE inclusive coming from data lines of FIG. 2 after level conversion; this circuitry is useful in ultimately establishing a mode of transmission which may reduce the number of data bits of a message transmitted to the receiving circuitry.

In FIG. 5:

MC is Master Clear, a signal sent through the complete logic circuitry for a short time following start up after a period of non-use. It clears all elements of the logic, removing any old settings, and makes the logic ready for reliable use.

RED is READ.

WRT is WRITE.

The numbers 1 through 4 following RED and WRT indicate respectively for each location: Command Rise at 1, Command Fall at 2, Service Rise at 3, and Service Fall at 4.

NWRT4 is not write 4.

WRT6 is a signal in Mode 2.

RR is Received Message, regardless of which end received.

X is output to first rank buffer control F1 as enable.

Y is output to first rank buffer control F1 as clock.

F1 is return signal from first rank buffer control, sent when that control becomes empty. This portion of the circuit in FIG. 5, as well as the portion to the right dealing with the X and Y pulses, operates at both ends of my logic in Mode 2.

RM=2 is Received Mode 2 signal of B end operation.

In FIG. 6:

RM=3 is Received Mode 3 signal of B end operation.

In FIG. 7:

=BM2 is a signal of Received Mode 2 at end "B".

In FIG. 8:

RM2 is Received Mode 2; here it is a signal at the A end reflecting receipt of a Mode 2 "acknowledgment" from B end.

RM3 is Received Mode 3; here it is a signal at the A end reflecting receipt of a Mode 3 message from B end.

SI within a circle indicates a specially generated signal for "Service In."

DI within a circle indicates a specially generated signal for "Data In."

Figure 9:
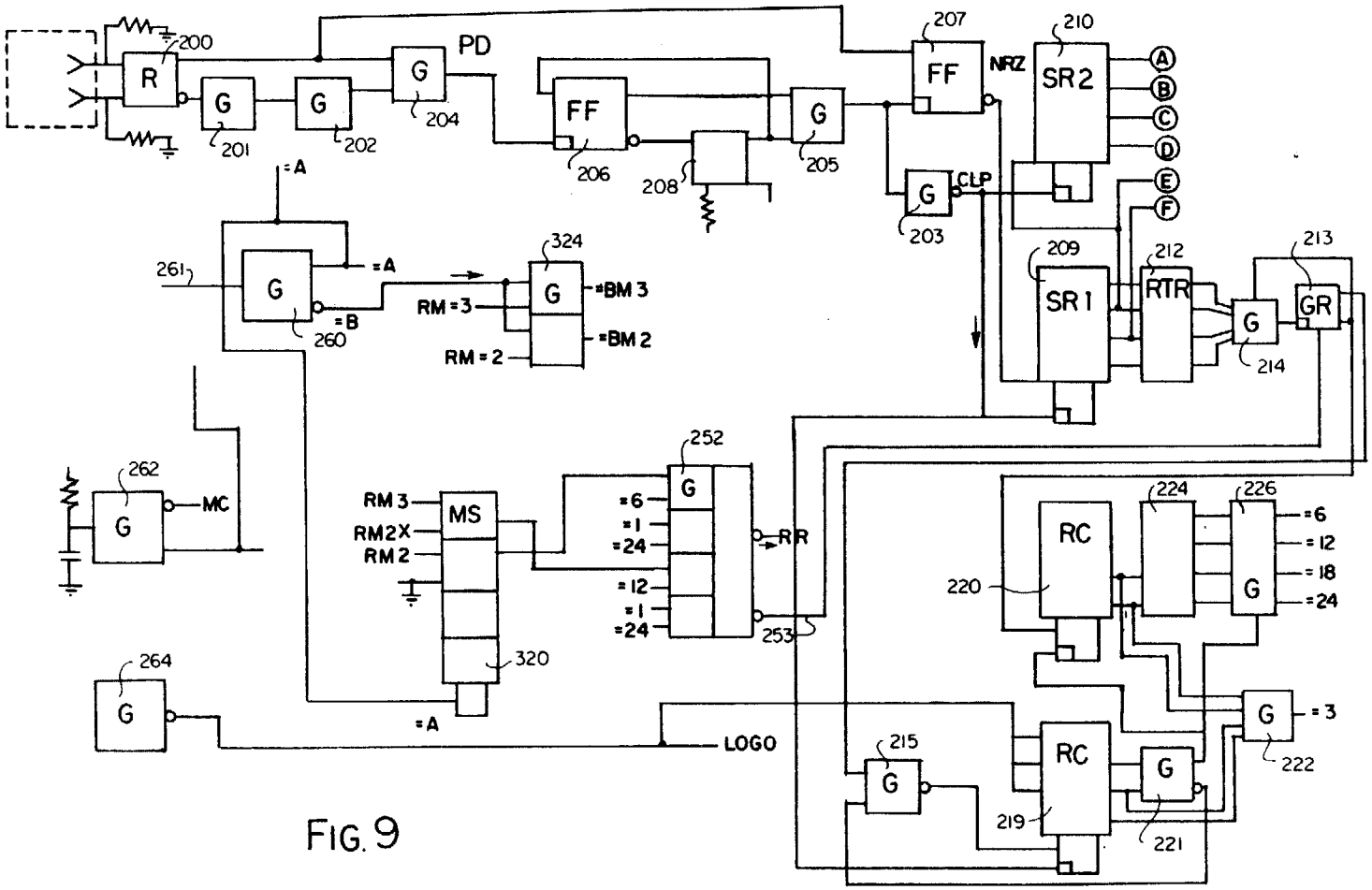
FIG. 9 is a diagram particularly illustrating my receiving circuitry, including a receiver R, phase demodulator PD, shift register means SR1 and SR2, and counter RC.

In FIG. 9:

R is Receiver.

PD is Phase Demodulator.

NRZ is Non Return to Zero.

CLP is Clock Pulse.

SR1 and SR2 are shift registers for restoring parallel form for the data transmitted serially.

A through F within circles are restored parallel data lines.

RTR is Receive Translator.

GR is Go Receive, a signal which starts a counter RC at receiving end, i.e., whether the A or B end.

RC is Receive Counter.

=6, as well as equal12, 18, 24, and 3 are all count signals.

=B relates to B End operation (Cf., =A).

RM2X is a special Mode 2 signal at the B or receiving end.

MS is a rectangular block is Multiplex Switch or Latch.

Figure 10:
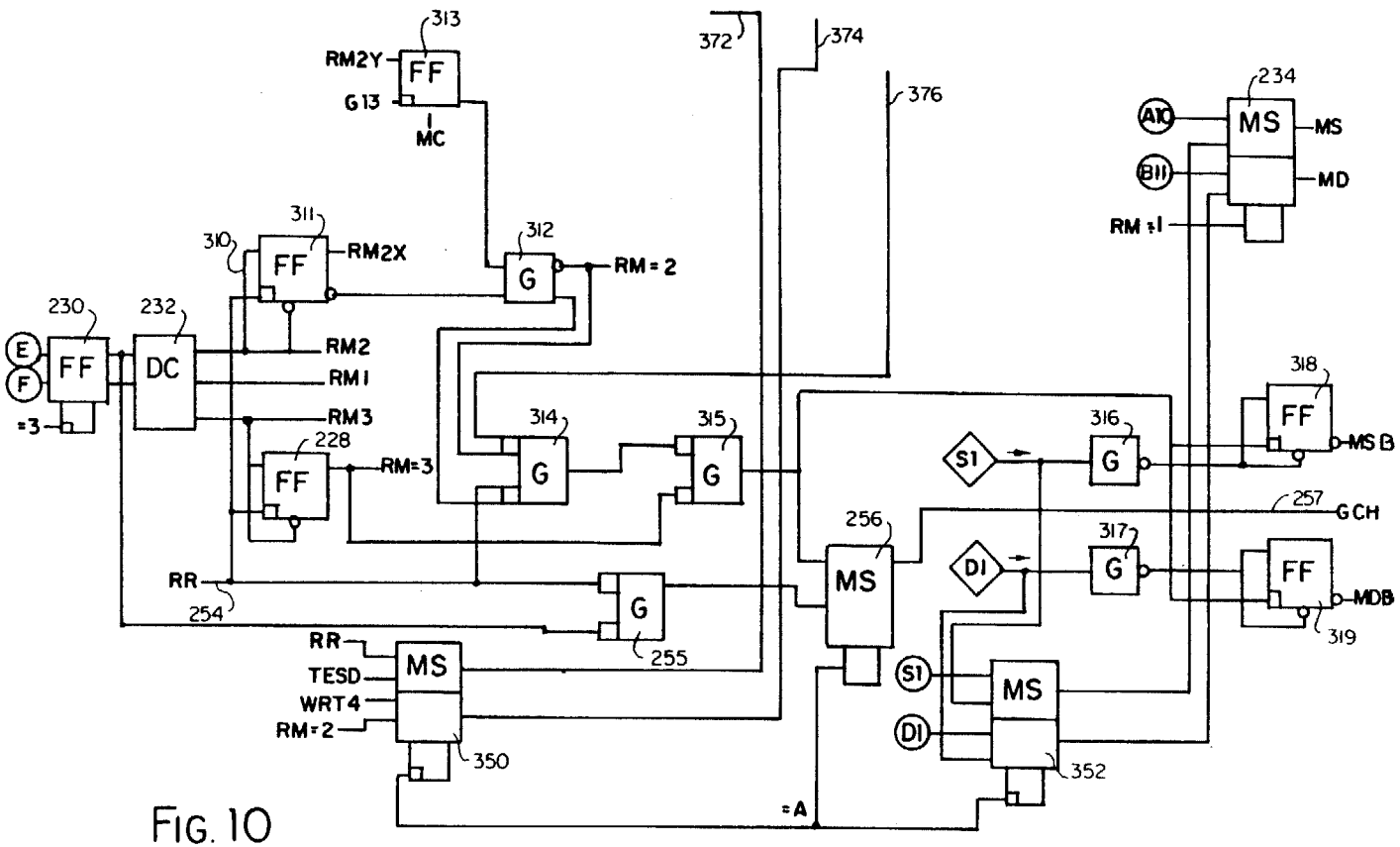
FIG. 10 is a diagram of a portion of circuitry particularly operable for receiving, with sampling inputs E and F employed, among other things, to establish the mode of operation of the receiving circuitry to conform to that of the sending circuitry.

In FIG. 10:

E and F within circles are sampling of mode bit signals from the first shift register SR1 in FIG. 9, taken at the count of=3, at which time those mode bits are at stations E and F of the shift register SR1.

DC is Decoder.

RM2Y is a special Mode 2 signal at the B or receiving end.

RM1 is Received Mode 1.

RM=1 is an enabling signal in this figure and comes from sand is the same as the RM1 output in this figure.

A10 and B11 within circles (at upper right of FIG. 10) indicate incoming connecting lines from A10 and B11 at the left of FIG. 11, those lies respectively being Service and Data lines for the purpose of illustration.

MS adjacent a line is Modified Service, either in or out depending on external device serviced.

MD adjacent a line is Modified Data.

MSB is Modified Service at B end.

MDB is Modified Data at B end .

GCH is Gate Channel.

In FIG. 11:

BR1 is a main bank of registers, and means buffer rank 1, that is the first rank of registers for holding parallel data after conversion of it from serial form into parallel form at the receiving end.

BR2 through BR12 indicate buffer registers 2 through 12 inclusive, that is, a total of 12 buffer registers capable of holding 12 bytes.

F1 through F12 indicate flip-flops indicating full or empty buffer registers of the same number.

G2 through G12 indicate gates for buffer registers of the same number.

G13 indicates an output pulse generated momentarily after data is taken out of the last buffer register BR12 by a peripheral device.

ON within squares refers to gates which will be described.

SW indicates a Switching Control for either allowing data in BR1 to go directly to the level converters RLC at the receiving end, or causing the data to pass through all the buffer registers BR1 through BR12. The input signal=BM2 causes data to pass through all the buffer registers.

Lines A10, B11 through E20 at left in FIG. 11 are indications of line outputs from certain of the first rank of buffer registers which connect to those locations so marked, mostly to the level converter RLC at the right in FIG. 11, except for A10, B11, and C12.

RLC indicates level converter at the receiving end, whether B or A.

DESCRIPTION OF THE PREFERRED EMBODIMENT

Referring to FIG. 1, digital data from an external COMPUTER passes through parallel channels to a LEVEL CONVERTER which merely changes the pulse levels from the computer to a level more readily usable within my logic circuitry, although my logic circuitry may indeed be employed without such conversion, if desired. A COMPARATOR samples the parallel stream of data signal from the LEVEL CONVERTER (illustratively what might be called TAG data) and compares that data stream one clock pulse of delay against itself to determine when a change occurs. At the change, a COMPARATOR pulse initiates a COUNTER which starts the MULTIPLEXER operation for serializing the parallel data from the LEVEL CONVERTER. In the normal mode or Mode 1 operation, where 24 bits are illustratively transmitted, the COMPARATOR pulse at this time also effectively causes initiation of the signal for the Mode 1 operation for full Multiplexing. Modes 2 and 3, however, are established by MODE sampling of data from the LEVEL CONVERTER and inserting special lead bits as the beginning bits of any byte passed or converted by the MULTIPLEXER into serial form. From the Multiplexer, the serialized data goes through PHASE MODULATOR which simply enhances reliability for long distance transmission. A DRIVER for transmission sends the serialized data out a line of a coaxial cable.

A RECEIVER at the other end of the cable passes the data through a PHASE DEMODULATOR. From that, it goes into a SHIFT REGISTER which converts the received data into parallel form. The lead message bit into the Shift Register initiates the action of a RECEIVE COUNTER which controls transfer of data from the SHIFT REGISTER to a MAIN REGISTER. The MAIN REGISTER may in fact be a first rank buffer register. However, before data is transferred from the SHIFT REGISTER into the MAIN REGISTER, lead bits establishing mode are sampled out of the SHIFT REGISTER to establish RECEIVE MODE signals which do two things. One is that of establishing the degree of counting by the RECEIVE COUNTER, and the other is that of controlling the SWITCH. In both Modes 1 and 3, the SWITCH allows all parallel data to pass directly from the MAIN REGISTER to the RECEIVE LEVEL CONVERTER and then to the external PERIPHERAL device at the receiving end.

But where the MODE established is that of Mode 2, a signal is generated which establishes a count of 12 by the RECEIVE COUNTER and also a signal is established that controls a SWITCH which blocks data from passing directly to the RECEIVE LEVEL CONVERTER. Under this condition, data in the MAIN REGISTER is passed through the BUFFER REGISTERS and collected until the PERIPHERAL requests data. At that point, through means not illustrated in FIG. 1, a signal is generated for passage of the temporarily stored data, on a first-in/first-out basis, from the BUFFER REGISTERS to the RECEIVE LEVEL CONVERTER and then to the external PERIPHERAL unit or device.

Figure 1A:
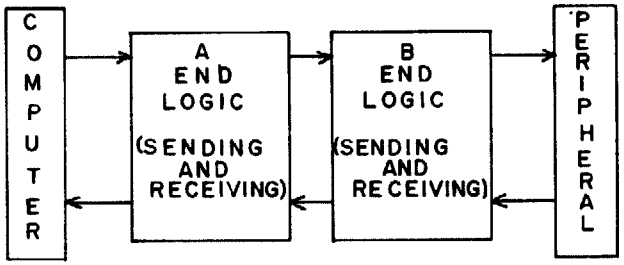
FIG. 1A is a simplified schematic diagram depicting my logic system between parallel channel external devices, namely a computer and peripheral device, and particularly illustrates the opposing ends A and B of my logic system (each of which includes both sending and receiving circuitry) and a separate transmission line for communication each way.

The purpose of FIG. 1A is to schematically illustrate the fact that each end of my logic system includes both sending and receiving circuitry selectively interconnected, plus the fact that one line carries transmission one way and a different line carries it the other way. Each end of my logic is designed for parallel interfacing with an external device, illustrated as a computer at one end and a peripheral device at the other. In this specification, the box or end labeled A is referred to as the end adjacent to the computer; and the box or end labeled B is that end which is adjacent to the peripheral device. Details of the A end sending and receiving circuitry as well as the B end sending and receiving circuitry are discussed hereinafter with reference to the remaining figures of the drawing.

Referring to FIG. 2, five Level Converters 100, also labeled LC, (quad BUS receivers, MC10129) are interface with a computer and particularly with the parallel output lines labeled 1 through 18 of the computer and provide a temporary latch storage of the data. (The same assembly is also at the opposite end of my circuitry and interfaced with a peripheral device.) The output of the Level Converters is connected in parallel to serializing means 110, such as 3 eight-station Multiplexers (MC10164; within the box representing one of the Multiplexers are numbers illustrating specific pin connections as employed.) Serialized output from these Multiplexers, in a sequence starting at the very top and terminating at the very bottom of the column of Multiplexers 110, passes out line 111 in FIG. 2 and is incoming at line 111 of FIG. 3 where it is delivered to a Phase Modulator 120 which may be of any suitable construction to enhance transmission—illustratively a dual Type D master-slave flip-flop 121 (MC10131), a quad OR/NOR Gate 122 (MC10101), and a triple 2-input exclusive-OR gate 123 (MC1672), in a known configuration for phase modulation.

Modulated pulses pass then to a Driver 125 (MC10192) for differential transmission to the opposite or B end of my logic circuitry. Any suitable Driver for sending the phase modulated pulses out through a conduit of any suitable type to the logic circuitry at the opposite end of the conduit may be employed. A conduit of coaxial cable is preferred. But even optical means such as fiber optics may be used, if desired. I favor differential transmission of parallel two lines each way for the comparative value inherent in the practice of differential transmission.

Continuing on FIG. 3, the operation of the sending logic circuitry is controlled by clock pulses from a Crystal Clock CC 130 whose clock pulses may be generated in any suitable manner (not shown) and sent through the output lines sown from it. Clock line 132 (lower left of FIG. 3) passes to FIG. 4 where it continues as line 132 feeding clock pulses into a first bank of Registers 134, also labeled RG1, as well as a second bank of Registers 136, also labeled RG2. The uppermost registers of each of these banks may constitute master-slave flip-flops (MC10176), each containing 6-bit flip-flops with clocking being common to all 6 individual flip-flops. However, since 8 lines are being fed in for comparative purposes, banks 134 and 136 each include two additional Registers, namely 134a and 134b and 136a and 136b. Each of these additional Registers suitably may consist of a dual master-slave Type D flip-flop (MC10131).

Incoming lines 10L through 17L at the left of FIG. 4 conduct samples of level converted output from lines of comparable number shown exiting from FIG. 2. The sampled output of these lines is passed in parallel through each Register 134 and 136, with the data in Register 134 being one clock pulse behind that in Register 136. For the most part, the sampling lines feed directly into the Register 134. However, in the case of line 12L, which illustratively carries converted level of a "command" line from a computer, and in the case of line 16L, which illustratively carries converted level of a "suppress" signal from a computer, there is interposed in each line before it reaches or is connected to the first bank of Registers 134 a special control box 137 and 138 respectively, each suitably consisting of a dual 2-wide 2-3-input OR- AND/OR AND-INVERT gate (MC10117). More will be said about this control later; at this point, since I am first covering the most simple operation, namely that for Mode 1, it is sufficient to note that the gates 137 and 138 operate to allow passage of signals therethrough on line 12L and 16L in the absence of special input of WRT4 or M2. (It should be noted that input M2 signifies a "mode bit 2", which is characteristic for either Mode 2 or Mode 3 and effectively alters gate 138).

To the right of the two banks of Registers 134 and 136 (FIG. 4) is a Comparator CP, suitably consisting of two gate units 140a and 140b, each suitably being a quad exclusive OR gate (MC10113). Outputs from each bank of Registers 134 and 136 are passed to the Comparator. Illustratively, lines exiting Register 134 labeled 11R through 14R are shown to continue into the Comparator by the same labeling at inputs of the Comparator. Thus the signals of control (e.g. TAG) in the bank of Register 136 are compared against those in 134, which is one clock pulse behind the signals in Register 136. Where the data in the two Registers is the same, nothing occurs within the Comparator 140. But where there is detected a change of data, which indicates the start of a message, the Comparator output 141, also labeled OP, is that of a pulse of one clock width which is carried over and enters at OP at the middle left of FIG. 5, marked as line 141. The same pulse of one clock width also travels out line 142. Gate 143 (a triple 2-3-2 input OR/NOR gate, MC10105)—assuming that other circuitry of my logic does not dictate any mode other than Mode 1—allows it to pass through and set the flip-flop 144 ( a master-slave flip-flop, MC10131) so as to provide a signal GO24 at its lower or complement pin.

The GO24 signal from flip-flop 144 (FIG. 4) enters at 145 in FIG. 3 and enters as GO24 in FIG. 6. Saving details of the circuitry of FIG. 6 for later, the result of a GO24 signal entering FIG. 6, absent signals causing a different mode for transmission, is that of establishing at this point a Mode 1 transmission. The outputs M1 and M2 from the circuitry of FIG. 6 enter the topmost Multiplexer in FIG. 2 and dictate the mode condition to be transmitted to the receiver logic at the remote end of the transmission medium.

The GO24 signal entering line 145 of FIG. 3 goes through logic which controls the Multiplexer operation in a manner that in fact causes the 24-bit transmission of Mode 1. A gate 146 (a triple 2-3-2 input OR/NOR gate, MC10104), having no contrary input, allows the GO24 signal through. From the gate, it goes to separate flip-flops 147 and 148 (each a dual type D master-slave flip-flop, MC10131). Also fed to these flip-flops 147 and 148 is the clock pulse coming from a like flip-flop 149 (MC10131) interposed in the line from clock 130. The input of half-clock time from flip-flop 149 is significant and perfectly times release of a signal for 24-bit operation from flip-flops 147 and 148 with the timed synchronization SYN. From flip-flop 148 the signal goes out line 102 as a Channel Latch CHLA signal to the line 102 of FIG. 2 and prevents change of data while multiplexing and sending the message or byte.

From flip-flop 147, the signal triggers initiation of count by Counter 150 (a universal hexadecimal counter, MC10136 and counter means 151 (a dual Type D master-slave flip-flop, MC10131), both operating at crystal clock CC time. The LOGO input comes from like labeling in FIG. 9 and is but a constant zero input. Outputs labeled $2^0$, $2^1$ and $2^2$ of Counter 150 are fed into Multiplexer 110 in FIG. 2 at the same respective labeling.

Control of multiplexer propagation times, that is, indexing from the first multiplexer to the second and then the third in the column of multiplexers 110 of FIG. 2, is accomplished by signals 0X, 1X and 2X form translator shift gate 152 (a Dual Binary TO 1-4-DECODER, MC10171) responsive to counters 150 and 151 in FIG. 3.

At this point reference is made to the leading inputs into the multiplexer 110 in FIG. 2. The Synchronization Signals SYN, from SYN in FIG. 3, are constantly generated and go out the multiplexer to synchronize the entire logic at the receiving end during non-multiplexing times, that is non-message times. The first bit following that is $-1$ (a constant input since a minus 5.2 which is interpreted by the logic as a "1" or "$=1$"). The $=1$ is the first "message" bit sent and received. Then follows the MODE bits M1 and M2; thereafter the message.

As a message is serialized by the Multiplexers 110, a translator gate 153 (FIG. 3), also labeled TR (suitably a triple 2-3-2 input OR/NOR gate, MC10105) senses the counts sent to the Multiplexers from the Counters 150 and 151. Outputs from the Translator 153 are "cancellation" outputs; and in the case of completing a Mode 1 or 24-bit transmission, the output $=24$ signal returns to flip-flop 144 of FIG. 4 to clear or reset that flip-flop. This completes the details for a Mode 1 transmission from the "A" end of the logic apparatus.

Refer now to FIGS. 9, 10 and 11 for a description of the logic involved in the receipt of that Mode 1 transmission at the "B" end or second end.

The receiver 200 (FIG. 9) is suitably a triple line receiver (MC10114), having one input connected to one line and a second input connected the second line of the coaxial cable, since differential transmission was employed in the illustrated case for greater accuracy and control. From the receiver, phase modulated data passes through a phase demodulator PD of conventional components and any suitable construction. The illustrated demodulator consists of OR/NOR gates 201, 202 and 203 (MC10101, exclusive OR gates 204 and 205 MC1672), master-slave flip-flops 206 and 207 (MC10131), and a delay line with resistor 208. The function of the Phase Demodulator is simple to return the phase modulate data back to its condition before modulation. It should be appreciated, though, that the illustrated demodulator also functions to separate the data and the clock signal when they are received in phase modulated form. Thus, the output of flip-flop 207 is that of non-return-to-zero data NRZ and the output of the OR/NOR gate 203 is that of the clock pulse CLP of data transmission. The NRZ data is immediately forwarded through Shift Registers 209 and 210, also labeled SR1 and SR2 (each a 4-bit universal Shift Register, MC10141), controlled by the clock signal from gate 203. The Shift Registers simple convert the serialized data coming in over the coaxial cable back to parallel outputs, which outputs are labeled A through F within circles in FIG. 9. While two 4-bit Shift Registers are illustrated, only 6-bit capacity would be necessary under the particular conditions shown where the parallel output at this stage is 6 bits in parallel.

A Receiver Translator 212 (suitably a quad OR/-NOR gate, MC10101) constantly samples the 4 bits from the Shift Register SR1 or 209. Recognize that the purpose of the translator is to determine when a digital data pattern of 1011 (i.e., the $=1$ start of message bit after synchronization) is outputted from the Shift Register SR1. Normally, the transmitting circuit is sending synchronization 101010, signifying that it is not active. However, when a message is to start, there will appear a 11 (e.g., bottom two stations of SR1 both carrying a 1 bit). The 1011 start output from the translator 212 sets a flip-flop 213 (master-slave, MC10131), also labeled GR, through the agency of a gate array 214 ( a dual 4-5-input OR/NOR gate, MC10109). When set, the flip-flop 213 puts out a signal GR, that is "Go-Receive", which starts both counters 219 and 220 (universal hexadecimal counters, MC10136), with the input to Counter 219 coming from flip-flop 213. The input to Counter 219 sets gate 215 (triple 2-3-2 input OR/NOR gate, MC10105).

The output from the counters is that of counts equaling 3, 6, 12, 18, and 24 as shown at the right in FIG. 9. How this is accomplished is as follows: Counter 219 only initiates the count and only counts to 6; at which time an OR/NOR gate 221 (MC10105) resets counter 219 and steps counter 220, which counts in increments of six thereafter. The gate 222 (dual 4-5 input OR/NOR, MC10109) responds at the count of 3 to send out an equal 3 signal which causes sampling of outputs circle E and circle F from the Shift Register 209. The sample outputs at circle E and circle F will be noted, at the count of equal 3, to contain the two mode bits, M1 and M2 as transmitted. They will be noted to enter the logic circuit of FIG. 10 at the left, where the labels circle E and circle F are found. That circuit will be explained below.

Completing the counter output circuit of FIG. 9, a decoder 224 (dual binary TO 1-4 decoder, MC10171) is interposed and passes output to a quad OR/NOR gate 226 (MC10101) which provides a sequence of count outputs at equal 6, then equal 12, then equal 18, and finally equal 24. These outputs from gate 226 control the filling of the Main Register or first bank of Buffer Registers labeled BR1, which will be further explained below.

The significant sequence of events at the receiving end requires now that the circuit treating the sampling of mode bits at the count of$=3$ be explained. This is shown in FIG. 10, where those mode bits labeled circle E and circle F are captured by flip-flop 230 (a hex "D"

master-slave, MC10176) whose output is sensed by a translator DC or decoder 232 (dual binary TO 1-4-Decoder, MC 10171). Since the illustrated transmitted message was in Mode 1, that is 24 bits, the output at Decoder 232 is that of a received Mode one, that is the output RM1, or normal. Other output lines from Decoder 232 are not significant for a Mode 1 receipt. The RM1 signal from the decoder becomes input as RM=1 at the upper right in FIG. 10, where it enters a modifier or selector 234, also labeled MS (a quad 2-input multiplexer/latch, MC10173) whose output will be explained after discussing the filling of the main bank Registers BR1 in FIG. 11.

Referring to FIGS. 9 and 11, it will be recognized that a 24-bit Shift Register need not be used, and that the counts 6, 12, 18, and 24 from the quad OR/NOR gate 226 are used to control the filling of four 6-bit Main Registers 240, 241, 242, nd 243, all also labeled as a first bank Buffer Register BR1 (each being a Hex "D" master-slave flip-flop, MC10176). The first 6 bits of a received data byte fill Register 240, and then Registers 241, 242, and 243 are filled with the remaining 24-bit Mode 1 transmission (shifting to each in sequence according to the count input setting). Observe that the first 3 bits of the byte, at the first 3 sections or stations or Register 240, are not meaningful for further handling. The external peripheral unit or device does not understand those bits which are solely used by my internal logic. Other bits, however, are allows to pass in parallel from the Register Bank BR1 to the peripheral unit at the receiving end in the following manner, as illustrated in FIG. 11: the first 9 bits after the introductory 3 (i.e., bits 9 through 12) go through by-pass lines 244 into a bank of Switches 245, 246, and 247, also labeled SW (quad 2-input Multiplexer/Latch, MC10173). These switches allow passage of the bits from BR1 through the switches to the receive level convertersRLC unless they receive a Mode 2 control input labeled =BM2, which they do not in Mode 1. Thus, in Mode 1, the first 9 bits (after the internal first 3) pass through switches SW into the bank of receive level converters 250 (each being bus driver, MC10128), where they are converted back to levels understood by the peripheral device and made ready for feed out to the peripheral device on lines 1 through 9 at the right in FIG. 11. The bits going out lines labeled A10 and B11 and C12 of register 242 (which illustratively represent service, data, and command signals from the computer, which are transmitted as "bits" and received here) are preferably handled somewhat differently, for reasons which will be evident below. I pass signals A10 and B11 from register 242 to a multiplex selector 234 (FIG. 10), which is also labeled MS (a quad 2-input multiplexer/-latch; MC10173), where they exit as signals MS and MD—here signifying service out and data out. (The RM−1 input is an enabling signal to selector 234 in Mode 1. It comes from and is the same as RM1 output from decoder 232 in FIG. 10.) Those signals A10 and B11 leave selector 234 as MS and MD and enter switch 247 (FIG. 11). In Mode 1, they go directly through switch 247 and are converted by the level converter RLC for lines 10 and 11 to the peripheral device. The "command" signal of line C12 from register 242 of FIG. 11 is passed directly to C12 of the gate 249 of FIG. 11 (a dual 2-wide 2-3-input "OR-AND/OR-AND-INVERT" gate; MC10117). With no contrary input to that gate in Mode 1, the C12 signal passes to the Receive Level Converter and out line 12. Remaining outgoing lines of registers 242 and 243 go directly to the level converter RLC for conversion. In essence, even lines A10, B11, and C12 of register 242 could go directly to the level converter RLC in Mode 1, but they are preferably handled as aforenoted inasmuch as the bits or signals (e.g., service, data, and command) carried by those lines are not part of the smaller message transmissions in other modes and yet are important for some types of equipment serviced by my logic circuitry and important for special purposes in Modes 2 and 3, as will be explained. Thus even in Mode 1, I control those signals, as illustrated.

To complete the circuitry for the Mode 1 condition, reference is made to FIG. 9, where translation gate 252 ("4-Wise" OR-AND/OR-AND-INVERT gate, MC10121) is fed the count totals from the Quad gate 226 of the counter circuitry (i.e., the significant totals for input here are at the counts of 6, 12 and 24, which are the three lengths of messages illustrated). Counting always stops at 24; and in modes other than Mode 1, it stops as a result of translator 252 interpreting the mode condition and count for it from selector 320 (MC10173), which in Mode 1 receives no input limiting the translator 252. Therefore translator 252 will not generate the RR output from it until it recognizes completion of the count of 24. At that point, signals of "receipt" come out of translator 2523 to do two things in Mode 1. One signal goes out line 253 to clear flip-flop 213, labeled GR, which stops the Receive Counter. Also, as the completion of the count, an RR signal from gate 252 enters FIG. 10 at line 254. In Mode 1 condition of 24 bit count, the only significant action of the signal RR (FIG. 10) is that of passing through gate 255 ( a dual 2-wide 2-3-Input OR-AND/OR-AND-INVERT gate, MC10117) to a controller or multiplex selector 256 (Quad 2-input multiplexer/latch, MC10173), and then out on line 257 as a gate channel signal GCH which enters FIG. 11 at line 257 to effectively allow passage of all parallel bits simultaneously to the level converters RLC and out to the peripheral unit.

Other circuitry in FIG. 10 is not needed in Mode 1 condition. Likewise all other circuitry so far not described is unnecessary for the Mode 1 condition; but the following should be noted: First, at the left in FIG. 9 is and OR/NOR gate 260 (suitably a Quad OR/NOR gate, MC10101). In the case of the assembly or box containing my total circuitry at one end, such as the "B" end or end adjacent an external peripheral unit, the wire 261 leading off gate 260 is grounded (or in a closed condition), making the "false" side of gate 260 mean=B. In the case of my total circuitry present in a box at the other end, such as the "A" or opposite end adjacent a computer, that wire is opened and not grounded, making the "true" side of gate 260 mean=A. The significance of this arises in connection with modes of operation other than Mode 1. However, note that the input line=A sets the condition of selector 320 in FIG. 9, which means that selector 320 in the B end circuitry (with wire 261 grounded at that end) operates to "pass" only the inputs of the second and fourth inputs to it; and the fourth input line is grounded so as to disable any 6 bit translation at gate 252 for generating exiting RR signals at the end of a 6 count. The condition illustrated assumes no receipt at the B end of any 6 bit message at any time. On the other hand, with wire 261 open at the A end, the first and third inputs namely RM3 and RM2, pass selector 320; and to be especially noted is that these pass to gate 252 to cause an RR output for the A end at the counts of 12 and 6, respectively, both of which can be relevant for A end receipt of transmissions from the B end. Also at the left in FIG. 9 are two other OR/-NOR gates 262 and 264 (each MC10101). Gate 262 controls the input of the Master Clear signal aforementioned. Gate 264 controls the condition for the logical zero connections, i.e., the LOGO condition.

Also to be recognized is that, in Mode 1 or normal operation using 24 bit data messages, the response from an external peripheral unit back to the computer is communicated in the same manner as that hereinabove described for a communication from the computer to the peripheral. Specifically, the sending circuitry of FIGS. 2, 3, 4 and 6 is present in my logic circuitry at the peripheral end and used by it to send a Mode 1 acknowledgment of 24 bits; and the receiving circuitry of FIGS. 9, 10 and 11 is present at the computer end and used to receive from the [periphery] *peripheral*. Of course, the bits of the [periphery's] *peripheral's* acknowledgment back to the computer may carry different significance (e.g. instead of service and data "out" bits, the [periphery's] *peripheral's* acknowledgment may be that of service and data "in" bits or signals for input to a computer, etc.).

Observe that in Mode 1, the messages through my logic are sent when signals rise or fall, and therefore trigger a comparator pulse.

Now to be considered is operation in Mode 2, the WRITE mode of transmission. In this mode, and also in Mode 3, the messages through my logic are sent only on the significant edge (leading or trailing) of service or data signals; and the significant edge of those signals varies depending on whether the A or B end is sending and whether the Mode is 2 or 3.

Thus, while the logic at the upper right and middle right of FIG. 4 was not significant for a Mode 1 condition, it is highly significant for Mode 2, and also Mode 3 (to be covered later). A multitude of gates are in this logic. Gates 180, 181, 182, 183 are AND gates (Quad 2-input AND, MC10104) for establishing a signal as labeled just to their right, namely TES, TED, LES and LED. Their input lines are shown; and it should be recognized that line 10L sampling is that of "service" and line 11L sampling is that of "data". Gates 184 and 185 are OR/NOR gates (triple 2-3-2 input, MC10105(, with their output being that of TESD and LESD, respectively. In Mode 2 transmission, the LESD signal from FIG. 4 enters at LESD in FIG. 3.

Gates 186, 187, and 188 in FIG. 4 are Quad OR/NOR gates (MC10101), with signals relevant to service and data exiting the Comparator 140 going to gates 186 and 187 respectively. A gate 189 (dual 2-wide 2-3 Input "OR-AND/OR-AND-INVERT, MC10117) receives input from OR/NOR gate 188, which in turn is fed from line 301. The group of gates 186 through 189 controls the signal to gate 143 in a manner that, once a Mode 2 or Mode 3 condition is signaled from line 301, the resulting signal from gate 189 to OR/NOR gate 143 places gate 143 in a blocking or NOR position preventing any 24 bit transmission until the Mode 2 or 3 transmission is completed.

The change to Mode 2 (or Mode 3) from Mode 1 involves special circuitry in FIG. 5. Illustratively, data bits for reading and writing and command are sampled after level conversion and before serialization. Thus, the lines marked DA through DE (FIG. 2) are sampled and the bundle of lines 104 for sampling connects with the lines of input marked respectively DA through DE in FIG. 5. Assume for purposes of illustration that lines DA through DD carry data bits 6, 7, 4 and 5, respectively, bearing on instructions for read, read backwards, write, etc. Assume that line DE carries command signals. The sample lines DA through DE feed an array of gates as follows: OR/NOR gates 160, 161 and 162 (Quad OR/NOR, MC10101); OR/NOR gates 163, 164, 165 (dual 4-5 input OR/NOR, MC10109); and AND gates 166 and 167 (Quad 2-input AND, MC10104).

The arrangement of these gates effectively combines sampled data in lines DA through DE to effect signals in lines 170 and 171. In line 170, the signal combines command and read or read backwards bit translations, whereas in line 171 the signal combines command with write bit translations.

At the right in FIG. 5 are two series of master-slave flip-flops (dual type D master-slave, MC10131). The upper four are labeled RED1, RED2, RED3 and RED4. The output lines at the extreme right of the upper four are coded with a signal marking RED4, which is a signal that ultimately dictates a READ mode or Mode 3. The output line coded WRT4 carries a signal that ultimately dictates a WRITE mode or Mode 2.

The setting and gaining of the output signals, either RED4 or WRT4, is accomplished by a few steps, which will be illustrated as basically four. The steps may vary depending on the nature of external devices employed. For purposes of illustration, a computer and peripheral may be exchanging random messages in Mode 1 and the computer may advise the peripheral that it has something which causes the peripheral to advise the computer that is has raised its "address in". The computer responds with "command out" and other pertinent instruction signals (leading toward read or write) which on sampling into FIG. 5 enter the first flip-flop in the series of four. Since the same steps are involved for establishing either a READ or WRITE condition, description of a WRITE condition is sufficient. Thus, the pulse enters WRT1 on the rise of the signal "command out". The response of the peripheral is a drop of address in; and the computer communicates back that it drops "command out", which on sampling in FIG. 5 is a "fall or drop of "command out" in flip-flop WRT2. Following a "status in" "acknowledgment" from the peripheral, the computer communicates "service out", which is a rise or change entering WRT3. Then after the peripheral responds dropping "status in", the computer communicates its fourth and last message in the process of establishing a Mode 2 (or Mode 3) condition. This fourth message from the computer at this phase is one which effectively is a fall of "service out" in flip-flop WRT4, which generates the Mode 2 output WRT4 in FIG. 5. Significantly, all messages in this sequence are 24 bit messages, communicated by my logic in the manner analogous to that illustrated for Mode 1. However, the last of these 24 bit messages, namely the one of WRT4, is the one setting the Mode 2 condition in my logic at both the A and B ends. Even so, it is, illustratively, a 24 bit transmission from the end of my logic adjacent the computer to the end adjacent the peripheral. How it is communicated in full multiplexing despite its introductory Mode instruction of Mode 2 will be explained below.

Of significance in explaining FIG. 5 operation is the input from FIG. 4. Observe that the comparator output in FIG. 4 at line 141 includes command comparisons of line 12L, but not service and data comparisons for lines 10L and 11L. The output including command comparisons enters FIG. 5 at 141, passes to gate 174 (MC10105) and then the pulses from gate 174 clear all flip-flops for read or write except the first flip-flop of each group of four. (The feedback from the second flip-flops RED2 and WRT2 clears the first flip-flops of each group.) Additionally, the comparator pulse entering line 141 of FIG 5 passes through gates 178 (MC10105) and 176 (MC10101), which delays the pulse until after the aforenoted clear action of it; and this delayed pulse sets or enables, as a clock input, the first and second flip-flops in each group of four. Recognize that once the command line signal of line 12L entering FIG. 4 has performed its function at the comparator and for the first two flip-flops of each group of four in FIG. 5, there should no longer be any comparator pulse out line 141. The reason is because the lines connecting from the Comparator to line 141 should thereafter not contain any change of data as the process of establishing Mode 2 or 3 is continued. (Should a comparator pulse come out line 141 at this stage, it means something is wrong and all flip-flops of each group of four in FIG. 5 will be cleared, cancelling any start into Modes 2 or 3). The next significant signal for clock input into the four flip-flop circuitry of FIG. 5 is that of SODO, which is developed (see FIG. 4) from signals in lines 10L and 11L dealing with service and data respectively. Until a Mode 2 signal is generated in line 301 of FIG. 4, the gate 188 allows passage of service and data signals through gate 189 as SODO. That SODO signal becomes the operative one at this stage to activate GO24 in FIG. 4. It passes through gate 143 to flip-flop 144 in doing so. (Once Mode 2 is established and fed into line 301 of FIG. 4, the gate 188 disables gate 189 to prevent further SODO signal exit for so long as the circuitry remains in Mode 2 or 3.)

In FIG. 5, the SODO signal sets the clock input of the flip-flops RED3, RED4, WRT3, and WRT4, and by delay through gates 178 and 176 does the same for the first two flip-flops of each group; but the sequence of signals effectively accomplishes movement of the instruction pulses through the four flip-flops for establishing a Mode 2 (or 3) condition.

Consider that the output WRT4 of FIG. 5 goes to four (preferably five) places in the logic circuitry at the transmitting end. It connects with a line marked WRT4 in FIG. 6. I connects with a line marked WRT4 at the lower left in FIG. 10, for reasons which will be hereafter explained. Again the reader is reminded that my complete illustrated circuitry is present at each end of the coaxial cable linking the same.) The third connection of WRT4 is shown in FIG. 5, namely to a special circuit at the bottom of FIG. 5. The fourth connection is at the left in FIG. 4. There is a fifth connection, namely that in FIG. 3 at flip-flop 196, where WRT6 alternatively might be used.

Note also that FIG. 5 shows an output signifying "false" WRT4, or not write four (NWRT4). That output is a significant input signal for the circuitry of FIG. 6, where Mode per se is established. The input of NWRT4 in FIG. 6 forces a Mode 2 despite the fact that GO24 is true and a 24 bit message is being sent. This is significant for that last or fourth communication from the computer to the peripheral in establishing a change of mode. It allows that last communication to be in full multiplexing, despite the introductory Mode instruction for Mode 2.

Referring now to FIG. 6, a mode discriminator 190 (a Quad 2-input multiplexer/latch, MC10173) receives its input directives from lines at its left. In tracing Mode 2 happenings, the relevant inputs are the NWRT4 and WRT4 inputs just mentioned. Output from the discriminator goes to a Quad AND gate 191 (a Quad 2-input AND, MC10104); and its output is that of the mode lines M1 and M2 feeding the multiplexer 110 of FIG. 2.

At this point, some consideration should be given to the manner of the B end behavior during the mode change instructions from the A end of my circuitry.

The B end adjacent an external peripheral receives the mode change messages and sends replies back to the A end in Mode 1 (i.e., 24 bits and GO24), except for the reply to the fourth and last mode change message from the A end where the leading bits establish a Mode 2 condition despite the 24 bits employed for that transmission. The mode bits of that fourth transmission would normally be expected to cause the receiving FIG. 9 circuitry at the B end to limit the count to 12; but I prevent that even though received message counts thereafter in Mode 2 are limited to 12.

Referring to FIG. 10, when the decoder 232 at the B end determines that the lead bits of the 24 bit message dictate Mode 2, the output from the decoder enters flip-flop 311 (MC10131) through line 310 and also at clear. The result is that the Mode 2 signal for gate 312 of FIG. 10 is held in flip-flop 311 until it is released at the clock input by a signal RR. The RR signal comes from the output of gate 252 in FIG. 9. Gate 252 receives no input from the multiplexer switch 320 that would trigger an RR output before a full count of 24 is recognized in gate 252, at which point the RR signal goes out and releases the temporarily delayed Mode 2 signal so that it exits flip-flop 311 in FIG. 10. Thus, the B end is not placed in a Mode 2 condition until after it handles that last mode change 24 bit message.

Beyond the fact that this special 24 bit received message goes from BR1 (FIG. 11) directly out to the peripheral unit in the manner of a normal Mode 1 communication, there is one further special action at the B end at this time. The released Mode 2 signal from flip-flop 311 enters gate 312 (MC10105) and generates, at the B end, a signal RM=2. That signal RM=2 is fed into gate 324 (MC10105) of FIG. 9 and, since the gate is set for B end operation, there is created a signal labeled=BM2.

The signal=BM2 thus generated enters FIG. 7, passes gate 340 (MC10101), sets flip-flop 342 (MC10131), and enters flip-flop 344 (MC10131) to cause the generation of a GO6 output. This occurs without any need for a TESD signal entering FIG. 7. Again one should remember that both ends contain my complete circuitry. The GO6 enters the B end sending circuitry of FIG. 3, which operates as before described except that the message is limited to a count of 6, consisting of a SYNC bit, a=1 bit, the two mode bits, plus two "bits" which are insignificant and have no meaning. The two mode bits from the B end FIG. 6 circuitry are established by the RM=2 input thereto. (Since=A is false in FIG. 6 at the B end, the effect is that RM=2 controls the mode output of FIG. 6 to be Mode 2 for the 6 bit transmission back to the A end.) The flip-flop 342 in the B end FIG. 7 circuitry is cleared by the channel latch CHLA signal from B end FIG. 3 circuitry, which also operates at the B end as described for the A end. Flip-flop 344 of FIG. 7 is cleared at the count of 6 from the B end FIG. 3 circuitry.

When this 6 bit message is received at the A end, passing through A end FIGS. 9, 10 and 11 circuitry, the A end uses solely the mode bits of it to create for the computer an acknowledgment input that causes the computer to believe that the peripheral device itself has sent a "service in" message, even though the message is not one from the peripheral device. The A end does that by using the RM2 output from the A end decoder 232 (FIG. 10), which enters the A end multiplexer switch 320 (FIG. 9), passes to gate 252 and exits as RR at the count of 6 at the A end. Then the A end circuitry of FIG. 8 is employed, with the RM2 signal entering flip-flop 366 (MC10131) and gate 370 (MC10105), and RR entering flip-flop 366 on clock. The resulting signal from gate 370 goes to flip-flop 362 (MC10131) and out as an SI signal. That signal SI enters the multiplex switch 352 (MC10173) at the A end FIG. 10 circuitry, which emits a signal to selector switch 234 at the A end. Switch 234 is capable of operation in any mode, i.e., the RM=1 input does not negate action in other modes. The result at the A end is that the output MS of switch 234 is actually a "modified service in", which enters switch 247 of FIG. 11 and passes to the computer, where it is received and interpreted as "service in" response from the peripheral.

Now, the computer is willing to release a byte of WRITE and does so; but before considering that, some additional details for the A end in Mode 2 should be covered.

Note that the M2 line of FIG. 6 is connected to the M2 line in FIG. 4, effectively causing a NOR condition for gate 143 and effectively blocking any "suppress" bits on the line 16L from passing gate 138. The WRT4 signal entering FIG. 4 from FIG. 5 similarly blocks any "command" bits on line 12L from passing gate 137, for so long as the Mode 2 (or Mode 3) condition is maintained. (In Mode 3, the WRT4 input would be RED4.)

Referring to FIG. 5, the behavior caused there by WRT4 at the A end will be explained. Of course, there is no WRT4 at the B end. (Pertinent circuits there are controlled by Mode 2 signals and derivatives thereof.) The WRT4 setting passes through a flip-flop 192 (Dual type D master-slave, MC10131) on each signal LESD from the line marked LESD exiting gate 185 of FIG. 4. (The LESD is an activator to cause the GO12 signal for each Mode 2 transmission.) At the A end, the significance of LESD may be taken as "Leading Edge of Service Out Data Out." In this circuit there is an OR/-NOR gate 193 (MC10105), another OR/NOR gate 194 (MC10101), and a flip-flop 195 (MC10131) from which two signals exit, namely a WRT6 and GO12. The GO12 goes to the input of identical marking in FIG. 3. The symbol F1 in FIG. 5 signifies an input which when true, signifies to the A end that buffer registers at the B end are not totally full (i.e., that space is available( and such significance at the A end allows the A end to transmit a 12 bit message of WRITE, which is passed into buffer registers at the B end. An F1 signifying full buffer registers at the B end will prevent the A end from sending in Mode 2 until an F1 "true" signal is generated at the A end.

The GO12 in FIG. 3 initiates the transmission in a manner comparable to that described for the GO24 transmission, except that transmission in Mode 2 is limited to 12 bits per message. The WRT4 (from FIG. 5) with clock release by LESD (from FIG. 4) goes to flip-flop 196 (MC10131) of FIG. 3. Flip-flop 196 provides a control signal for the channel latch signal 102, which signal is cancelled at the count=12 out of Translator 153. Flip-flops 148 and 196 in FIG. 3 suitably may function on an "or" basis for the channel latch signal of line 102. (The WRT6 output in FIG. 3 could, for high or highest speed transmission, be the input replacing the constant enabling WRT4 to flip-flop 196 if desired.)

Explanation of the remainder of FIG. 5 as to Mode 2 transmission as well as the significance of WRT4 in FIG. 10 and other happenings in Mode 2 at the transmitting end are best accomplished after discussing some happenings at the receiving end.

Referring to FIGS. 9 and 10, initial happenings in Mode 2 at the B end beyond those covered above for generation at the B end first 6 bit "acknowledgment" will be covered. At the B end, the Mode 2 signal released from flip-flop 311 (FIG. 10) by the RR input is referred to as RM=2, as distinguished from RM2 which is the signal of receipt in Mode 2. The B end RM=2 signal is generated at the upper output of OR/-NOR gate 312 (MC10105). One should be reminded that this delayed RM=2 signal allows the first Mode 2 message which is 24 bits (i.e., for fall of service out) to be fully received at B end before changing modes. Also a delayed signal RM2X is generated from the flip-flop 311 for each byte of Mode 2 message.

The signal RM2X enters FIG. 9 in a multiplex switch 320 (MC10173). It sets that switch and effectively thereafter limits the count to 12 bits for so long as Mode 2 is maintained a the B end. When the count of 12 enters gate 252 from the translator gate 226 of the counter, a signal goes out line 253 to Go Receive 213 to stop the Receive Counter 220. At the same time, the RR signal from gate 252 is generated.

The RM=2 signal from gate 312 (FIG. 10) entering FIG. 9 at OR/NOR gate 324, causes the signal=BM2, earlier mentioned. This signal=BM2, apart from its function earlier mentioned, enters FIG. 11 as the signal controlling the switches 245, 246 and 247, effectively causing subsequent data of Mode 2 (12bits) to enter the buffer registers (all MC10176) instead of allowing subsequent Mode 2 data (after the special 24 bit mode setting communication) to by-pass the buffer registers.

The signal RM2X from flip-flop 311 (FIG. 10) goes to FIG. 11 and enters the lower second set buffer register BR2. (The RM2X of each Mode 2 receipt does this.)

Further, control for shifting all 12 bit WRITE data through the buffer registers of BR1 through BR12 of FIG. 11 is initiated. How this is done requires reminder that the entire circuitry is present at both ends. The control or recognition at the A end as to the availability of buffer space at the B end is best understood after knowledge of what is happening as WRITE mode "bytes" (of 12 bits) are received at the B end. At that B end, RM=2 of FIG. 10 and the RR signal from FIG. 9 are entered (FIG. 5) at the multiplexer switch 330 (MC10173) and provide output signals X and Y which at the receiving or B end circuitry enter flip-flop 331, also labeled F1, at about middle left of FIG. 11. All flip-flops F1 through F12 are master-slave (MC10131); all gates G2 through G12 are triple input OR/NOR (MC10105) and all return gates marked ON are Quad OR/NOR (MC10101). What happens is that the X and Y signals at the B end set F1 to indicate register BR1 is full. But if BR2 is empty and BR1 full, a pulse is generated which causes gate G2 to open the Buffer Register BR2 for data from BR1 to move into it, or shift or transfer data from BR1 to BR2. This simultaneously causes clearance of flip-flop F1 to indicate that buffer register BR1 is capable of receiving data and sets F2 indicating BR2 is full. The signal from G2, opening BR2 for data, also sets master-slave flip-flop F2 on clock causing G3 to permit the data to shift from BR2 into BR3 (if empty) and clear F2, etc., until the initial data is transferred into Buffer Register BR12, at which time a pulse from G12 sets F12 to indicate that the data has entered BR12 and that BR12 is full.

Simultaneously, while the foregoing shift of data through the buffer registers at the B end is taking place, the A end circuitry of FIG. 11 is, to a limited extent, duplicating the B end. Specifically, at the A end, the input in FIG. 5 to selector or multiplex switch 330 (MC10173) is a constant=1 (i.e., an "open" line) and the signal for a 12 bit transmission from flip-flop 195. The output X and Y at the A end enters F1 flip-flop 331 (FIG. 11) at the A end and goes through the flip-flops F1 through F12, essentially duplicating their action at the B end, but without data in the A end buffer registers (which maybe omitted, if desired). This is done at the A end solely for the purpose of keeping track of buffer register available space at the receiving end, for reasons which will be evident below.

At this time, some additional features of the B end in Mode 2 should be explained.

Referring to FIG. 10, gates 314 and 315 as well as 255 are all OR/AND/OR-AND INVERT (Dual 2-wide 2-3-Input, MC10117). Gates 316 and 317 are OR/NOR gates (Quad, MC10101). Flip-flops 228, 313, 318 and 319 are dual type B master-slave flip-flops (MC10131). The multiplexer switches or selectors 234, 350 and 352 are all Quad 2-Input multiplexer latches (MC10173).

In FIG. 11, gate 334 is an OR/NOR gate (MC10105); gate 335 is also OR/NOR (MC10101); and flip-flop 336 is master-slave (MC10131).

As data is passed to the last rank BR12 buffer, the pulse from G12 passes an ON gate to set F12, but not on clock, and passes through gates 334 and 335 to set flip-flop 336, which may be considered the thirteenth in the flip-flop series. Flip-flops F12 and 336 remain set until the action by the peripheral device causes them to be cleared, as follows: A "service in" request for a byte by the peripheral (entering the B end circuitry of FIG. 4) generates LESD. (Recognize, as will be evident, that both the leading edge and trailing edge of service or data are significant signals for the B end operation adjacent the peripheral device.) The LESD enters the flip-flop 336 and clears it by clocking ground into it. It is the clearing of this flip-flop 336 from its set condition (which reflects data in BR12) that effects a signal back to gate 334 which temporarily causes zero entry to flip-flop 336 and a signal in line 376. (Recognize that a GO24 sent message would clear the senders flip-flop 336). The signal in line 376 enters FIG. 10 at gate 314, passes through gate 315, and then clocks out a signal response to the request by the peripheral from flip-flop 318, namely a MSB signal signifying "service out", or a statement that your "byte" is hereby supplied. This signal will be further explained. It is generated at the B end from the peripheral's request, that is the peripheral's signal is turned back to it in the form of a signal which it accepts as one from a computer, namely, "service out". Nearly simultaneously, the gate channel signal GCH (FIG. 10) for delivery of a byte from BR12 to the peripheral is also generated by my B end logic handling the peripheral's request. At this point we must also recognize that the request by the peripheral which generated LESD in FIG. 4 also was effective to generate the SI signal (shown in a diamond) in FIG. 4. That SI signal enters the B end circuit at SI (in a diamond) in FIG. 10, passes gate 316 and is ready for the clock release caused by the signal in line 376 passing through gates to flip-flip 318. The output MSB from flip-flop 318 is effectively a "service out" signal for the peripheral. (Had the peripheral made a request by "data in", effective response to it as "data out" would be generated as MDB in flip-flip 319, in a manner comparable to that of the service request.) The "service out" together with the data in BR12 are gated as aforenoted and accepted into the peripheral; and the peripheral acknowledges by dropping its "service in", which causes a TESD operation in the B end circuitry of FIG. 4. (Remember that the sending circuitry discussed above is not just interfaced with the computer, but also the peripheral.)

The TESD at the B end then causes two important events. One is that it enters the circuitry of FIG. 7 to cause a 6 bit transmission of acknowledgment to the A end; that will be explained below. The other is that the TESD so generated at B enters the B end FIG. 10 at selector switch 350 and goes back through line 372 to F12 to clear F12 in FIG. 11 by clocking ground into it. (The RM=2 input to selector gate 350 causes constant enabling signal of Mode 2 through line 374 to F12.) This clearing of F12 merely confirms that the byte in BR12 has been taken by the peripheral. Immediately, the gate G12 pulses and allows data in BR11 into BR12 and effectively sets F12 and also flip-flop 336. The next normal step for the peripheral is to raise its "service in", that is, request another byte, and it does so. The process just noted is then repeated and repeated until the data shifting through the buffer registers on a first-in/first-out basis is taken by the peripheral. At that point, flip-flop 336 will not be set. Thus, any request LESD will not effect any signal out line 376 of FIG. 11.

Significantly, as each data byte is moved through the buffer registers, the RM2X signal from flip-flop 311 of FIG. 10, for each byte, passes with the byte through the buffer registers and exits BR12 as RM2Y. The signal RM2Y enters FIG. 10 at flip-flop 313. Thus, the RM2Y of each byte sets flip-flop 313; and G12 off gate 334 then clocks it out or clears flip-flop 313 of the RM2Y for the byte at the time the peripheral empties or takes the bye from BR12. Significantly, the pulse G12 from gate 334 in FIG. 11 clears flip-flop 313 and that flip-flop is left clear when the buffers are clear of data. Note also that gate 312 of FIG. 10 maintains a Mode 2 output of RM=2 if either flip-flop 313 or 311 are set.

It will be appreciated that a computer adjacent the A end may well finish its WRITE to a peripheral before all bytes of Mode 2 have been removed from the buffer register by the peripheral. At that point the computer may signify its completion by raising "command out", which will effectively remove the A end from Mode 2 into Mode 1 and generate a 24 bit transmission to the B end. This could put the B end in danger of losing data but for the aforenoted control of its Mode 2 condition until it empties the buffer registers. But even that control can be dominated by a computer command; and to prevent that occurrence, the command line C12 in buffer 242 is connected to gate 249 (MC10117) in FIG. 11 instead of directly to a receive level converter RLC. The B end input to that gate of=BM2 (which is from the output of the gate 324 of FIG. 9 having an RM=2 input) stops the command out from passage until the peripheral completes its work in getting the data from the buffer registers. At that point or in case of previously detected error the peripheral sends out "status in", or ST, at the B end (see FIG. 4); and that signal of ST is passed to gate 249 of FIG. 11 where it cancels the Mode 2 signal and allows the command out signal from the computer to pass to the peripheral; and then B end circuitry reverts to Mode 1.

Before returning to the A end for Mode 2 happenings, mention should be made of the second important event caused by the TESD at the B end, where the leading and trailing edge of service or data output from the peripheral effectively causes successful B end operation. The second important event is that of generating an acknowledgment back to the A end. The acknowledgment is one of only 6 bits, as aforenoted, but is generated differently from the first "service in" acknowledgment. The TESD enters the FIG. 7 flip-flop 344 on clock and, since that flip-flop has been set by = BM2, the GO6 output causes the 6 bit transmission to the A end. Only the two mode bits of Mode 2 set by = BM2 are significant, as in the case of the special first Mode 2 acknowledgment from the B end. It is important to recognize that the B end sends an acknowledgment of this type for every byte it takes from the BR12 bank of buffer registers.

At the A end, these acknowledgments during Mode 2 permit monitoring by the A end of the status of buffer space at the B end.

While buffer registers are not necessary at the A end, the control circuitry of F1 through F12 in FIG. 11 is at least duplicated at the A end. Thus, as each Mode 2 message is transmitted from the A end, the A end output of selector switch 330 of FIG. 5 (governed by inputs of = 1 or opening and GO12) enters the A end F1 flip-flop F1 (see FIG. 11) just as occurs at the B end. As at the B end, the gating to and sequential setting and clearing of flip-flops at the A end takes place through to F12, with flip-flops F12 and those behind it set in parallel with flip-flops of the same designation at B.

An F1 output (signifying clear) from flip-flop 331 at the A end is required as an input to gate 193 of FIG 5 to enable that gate before the A end will send a GO12 signal for a WRITE message to the B end. (The LESD from FIG. 4 for each WRITE message the computer is about to send is a clocking input to flip-flop 192 for that sending circuit; but availability of buffer register space by the F1 input is required before a transmission of GO12 is ordered.) Without knowledge as to buffer availability at the B end after twelve bytes or messages of WRITE, the A end could be stalled. The needed knowledge for the A end is gained from the 6 bit acknowledgments from the B end. Upon receipt at A, the RR signal so generated enters the A end selector 350 of FIG. 10 which also has the WRT4 input of the A end. The WRT4 maintains the Mode 2 condition for selector 350 at the A end just as RM = 2 does at the B end. It is the RR signal at the A end, on receipt of each 6 bit acknowledgment from B, that clocks clearing of F12 at the A end (through line 372 of FIGS. 10 and 11) and allows shift of intelligence from each lower flip-flop in the series into the next higher. Thus, the availability of buffer space at B is monitored at the A end and permits great time saving. Transmission from A to B and vice versa (e.g., 12 bit WRITE bytes and 6 bit acknowledgments) can take place simultaneously since different lines are preferably employed; and each end contains logic used to maintain operation of the external devices by converting their own signals into ones each "believes" is from the other.

To satisfy an external computer's requirement for a "service in" or "data in" communication (as from a peripheral unit) before a byte is released by it, I employ a special circuit illustrated in FIG. 8 to generate response to the computer from the computer's own output. The circuit consists of flip-flops 360, 362 and 364 (MC10131) and a gate 368 (MC10117). Flip-flop 360 is equipped with a circuit shown in the drawing as having a conventional switch(left open in the drawing). In the condition shown in the drawing, but with the switch closed, flip-flop 360 toggles between service and data, that is, causes the output of SI and DI, as shown at the right in FIG. 8. But if that switch were open, the output of flip-flop 360 would not set flip-flop 364 and thus would cause SI, or "service in", repetitively. This circuit is used at the A end, with the inputs RR, RM3 and RM2 all coming from the A end receive circuit of FIGS. 9 and 10, with WRT6 coming from FIG. 5, and with M2 from FIG. 6. Note that RM2 from FIG. 10 and WRT6 from FIG. 5 are the significant gate 368 inputs for Mode 2 operation, and that RM2 is a constant or set condition. Thus, on sending a 12 bit Mode 2 WRITE, the signal WRT6 gated signal to the flip-flops of FIG. 8 effectively causes the SI and DI outputs, which enter the selector switch 352 of the A end and generate the MS and MD signals from selector 234 (FIG. 10). Those signals are passed back to the computer through its switch 247 (which does not get any input control of = BM2 at the A end) and through the applicable receive level converter at the A end. Clearance of flip-flops 362 and 364 of FIG. 8 occurs then when the next message is sent, at the LES and LED signals from the A end FIG. 4. The essential point is that FIG. 8 circuitry is specialized and adjustable to provide whatever return signal is needed to satisfy the demands of an external computer for continued release of bytes or messages. The circuit generates the return signal using the computer's output, which initiates action by my A end sending circuitry. The arrangement permits a computer to send WRITE message bytes as fast as it can, limited only by the availability of buffer receipt. In this respect, more buffers than illustrated (or less) may be employed.

As emphasized above, the speed of A end operation in Mode 2 is especially significant; and the sending circuitry of FIG. 3 with counting and GO12 operation (from FIG. 5) as well as count clearance (for flip-flops 195 and 196 of FIGS. 5 and 3) all operating at an optimum rate consistent with the noted input controls.

Some other observations are: Gates 314 and 315 (FIG. 10) for channel latch at the A end are not necessary. The channel latch at the A end is essentially wide open at the A end in both Mode 2 and Mode 3. Most computers are capable of greater speed than peripheral devices. Also in FIG. 10, observe that the line from the upper mode bit just before decoder 232 and extending to gate 255 is a line which always carries bits indicating either Mode 2 or Mode 3, controlling passage at gate 255 (MC10117).

Mode 3 operation will normally be established at the end of my logic adjacent a computer. The steps are analogous to those for establishing Mode 2, as discussed above and illustrated in FIG. 5. In mode 3, at the "fall" of service establishing it, where RED4 input is made in the mode setting circuit of FIG. 6, the B end's receipt of the 24 "bit" establishing transmission is held by flip-flop 228 (FIG. 10) in a manner analogous to that explained for flip-flop 311 for Mode 2. The output RM = 3 arises on RR time, that is after the 24 count (FIG. 9). This puts the B end in readiness for sending its READ messages, which are mode established by the inputs RM=3 in FIG. 6. Since computers are normally faster than peripherals, use of buffers for receipt at the A end is unnecessary.

In Mode 3, as soon as the peripheral starts its first message, which generates SI and DI (FIG. 4), a reply at the B end is generated (see SI and DI in FIG. 10 and the RM=3 for gate channel GCH) and sent right back to the peripheral; and this proceeds during the peripheral's sending of READ messages to the computer.

All Mode 3 messages are 12 bits in length. The RM=3 (from FIG. 10) input at gate 324 (FIG. 9) provides a signal=BM3 which sets the B end flip-flop 400 (MC10131) of FIG. 4 for clocked sensing on LESD. The GO12 and clear=12 operate as before discussed in the circuit of FIG. 3.

At the A end, received messages of Mode 3 are processed through the circuit of FIG. 9, with selector input RM3 (from FIG. 10) setting the 12 count. The FIG. 8 circuit, with RM3 input to gate 368 being the enabling input, provides the missing SI "bits" (and if needed, the DI bit) for the computer; and these are generated in RR time, that is, the RR input from FIG. 9 at A end. They enter selector 352 and go out as MS and MD, gated on RR time (FIGS. 10 and 11).

Figure 12:
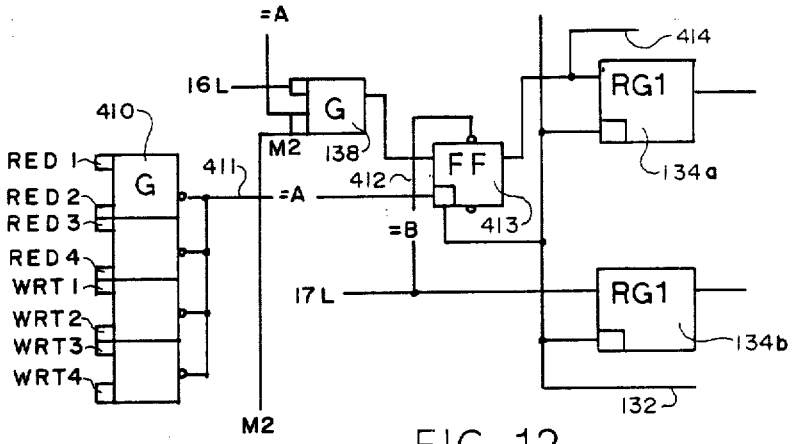
FIG. 12 is a diagram of an alternate form circuitry for the circuitry illustrated at the lower left of FIG. 4.

Refer now to FIG. 12, which shows replacement circuitry for the lower left of FIG. 4. The FIG. 12 circuitry is very effective in stopping a computer's suppress signal of line 16L from propagating into the first bank registers RG1 when the transition is taking place to a Mode 2 condition. The circuit of FIG. 4 is also effective to do so, but only when or after WRT4 from FIG. 5 has been set to cause an M2 signal. FIG. 12 circuitry is an improvement in that it is effective to stop a suppress in line 16L at any stage during the transition to the WRITE or READ condition.

FIG. 12 circuitry, at the A end, has a gate 410 (dual 2-wide 2-3-input "OR-AND/OR-AND-INVERT", MC10117) whose inputs labeled RED1 through RED4 inclusive and WRT1 through WRT4 inclusive are from the respective outputs of like labeling in FIG. 5. All output from the gate goes through line 411 to a clock input of flip-flop 413 (a dual type D master-slave flip-flop, MC10131). Recognize also that the flip-flop receives clocking input from line 132; and that line also carries clocking for the shift through the registers RG1 and RG2 to the comparator as shown in FIG. 4. Further at the A end, the output of gate 138 is passed to the flip-flop 413. In the normal Mode 1 condition, with no line 411 input to flip-flop 413, that output from gate 138 passes directly through flip-flop 413 to the first bank registers RG1. But in the transition condition toward READ or WRITE, output from gate 410 blocks passage of any signals through flip-flop 413 from gate 138.

The arrangement of the FIG. 12 circuitry at the B end or B box employs a peripherals incoming signal on line 17L to pre-set flip-flop 413. This, in essence, forces any "request in" entering line 16L from any peripheral into a false condition, a feature especially desirable when multiple peripherals are serviced at the B end. In effect, an "operational in" signal of line 17L prevents any "request in" on 16L from passage through the flip-flop 413. This is especially important where two different peripherals are serviced by the B box circuitry. Thus the "operational in" peripheral is effectively the controlling peripheral to stop any "request in" signal from the other. The purpose of FIG. 12 circuitry is to not only stop any "request in" from generating a GO24 signal, but also to make sure that the computer at the other end or A end does not see any "request in". That feature is effectively accomplished by forcing any "request in" to zero. In this respect, it is important to recognize that the circuitry of FIG. 2 is somewhat modified at the B end as follows: Specifically, line 16 (FIG. 2) after leaving the level converter labeled LC is broken or removed between the joining of 16L to it and the multiplexer 110. In replacement for the line 16 input to the multiplexer is a line labeled 414 in FIG. 12. Thus, line 414 is fed as a substitute line 16 to the multiplexer 110 at the B end, with the result that any "request in" signal on line 16L by any alternate peripheral is fed through as a zero.

Refer now to the circuitry of FIG. 8, which operates at the A end to provide the computer with "service in" SI and "data in" DI signals that are missing in the Modes 2 and 3 transmissions from the B end, and that are also missing between bytes of Mode 2 transmission from the computer end to buffer storage at the B end. That circuitry needs but slight modifications in order to make it more effective or to improve it for operation at lower speeds. Recall that the B end box itself, not the peripheral, initiates the first Mode 2 acknowledgment back to the computer; and that first acknowledgment is generated by the signal =BM2 signal enters FIG. 7 to trigger the first GO6 acknowledgment back to the A box. It lacks any "service in" SI bit. In the A box, receipt of that short 6-bit acknowledgment is such that on decoding (FIG. 10) the flip-flop 311 generates a signal RM2X. One improvement for FIG. 8 is to use the signal RM2X as a replacement of the RM2 input to flip-flop 336 in FIG. 8, and not use the RR input to flip-flop 336. As soon as that RM2X signal goes through flip-flop 366 and gate 370 and flip-flop 362, the SI or first "service in" signal is generated for the computer at the A end. Simultaneously, when that first "service in"0 signal is generated, a bleed off of it in a line (not shown in FIG. 8) is passed back to the clock input of flip-flop 366 (in replacement of the RR input for flip-flop 336). The result is that the flip-flop 366 is set or cleared and made ready for another RM2X.

A still further improvement in the circuitry of FIG. 8 for the A end is that of a substitution of trailing edge of service or data, TESD, for the WRT6 input to gate 368. The TEDS input comes from the output of like labeling in FIG. 4, and is generated at the A end as the Mode 2 messages are sent for filling the buffer registers at the B end. This improvement slightly slows down the "service in" or SI response generated by the FIG 8 circuit for sending back to the computer. The WRT6 input to gate 368 tends to cause the SI to occur too fast and allows the computer to change data in some instances. The noted improvement does not allow the sending of the next "service in" until the transition or "service out" drop. In effect, the fragmentarily delayed "service in" signal accomplished by employing TESD instead of WRT6 as an input to gate 368 slows response to the computer sufficiently so that there is no improvident change of data for any single byte.

Figure 13:
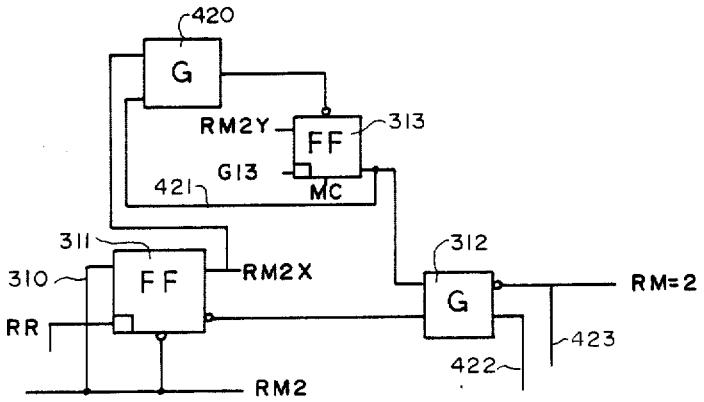
FIG. 13 is a diagram of alternate form circuitry for my circuitry at the upper left in FIG. 10.

Referring to FIG. 13, the added circuitry option there illustrated for the upper left of FIG. 10 contributes to a forcing of a preset of Mode 2 condition in flip-flop 313 at the beginning of Mode 2 or the WRITE condition. Gate 420 (MC10105) receives the RM2X input from flip-flop 311 at the start of Mode 2. In this circuit, when flip-flop 311 is set and flip-flop 313 is clear, the RM2X output through line 421 forces flip-flop 313 to set; and as soon as it is set the condition for its setting is removed. The circuit contributes to maintenance of the RM=2 output at gate 312.

Refer now to FIGS. 10 and 11: a further improvement is to entirely remove the line 376 from gate 334 of FIG. 11 to gate 314 of FIG. 10, and thus in essence remove the G13 type signal from passing from gate 334 to gate 314. At the B end this, in essence, causes the peripheral to look at the last buffer at all times in Mode 2. At the A end, line 376 is unnecessary. In essence, the removal of line 376 functions to provide no gating of channels for external device receipt in Mode 2 condition.

Figure 14:
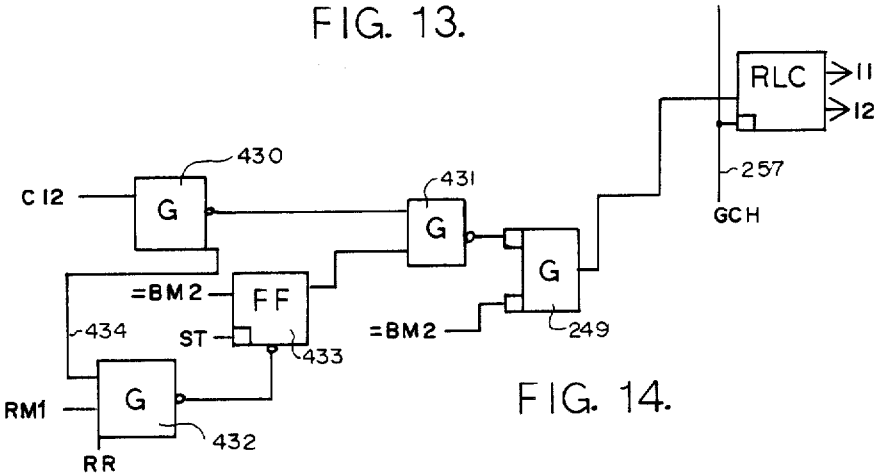
FIG. 14 is a diagram of alternate form circuitry for interposing between C12 and exit line 12 in FIG. 11.

In FIG. 14, the further improvement illustrated can be looked upon as in essence providing new circuitry for the inputs to gate 249 of FIG. 11. In FIG. 14, gates 430, 431, and 432 are all triple 2-3-2 input OR/NOR gates (MC10105); and flip-flop 433 is a dual type D master-slave flip-flop (MC10131). As before, =BM2 functions to block passage of a line C12 signal in Mode 2. But, if the condition arises in Mode 2 that a peripheral raises "status in" ST (see FIG. 4), the ST will set flip-flop 43. That setting combined with gate 431 will effectively continue to prevent any incoming C12 signal (such as Command Out) from going to the peripheral during Mode 2. Once flip-flop 433 is set, it will only clear on Mode 1, on the RR input to gate 432 after that gate receives input of RM1, and absence of Command Out.

A multitude of applications exist for the essential principles of my invention beyond those particularly described in connection with the preferred specific embodiment illustrated in the drawings. Various combinations and subcombinations may be employed to enhance distance communication without departing from the essential principles disclosed. Equivalents known and developed hereafter may be employed for different positions or subcombinations disclosed without departing from the essential principles; and in this respect the claims appended hereto and made a part of this specification should be construed as broadly as consistent with their validity.

That which is claimed:

1. A logic system for transferring digital data between parallel channel digital data external devices, said logic system having a first end equipped with an incoming parallel channel and an outgoing parallel channel interfaced with a first said parallel channel external device, and a second end equipped with an incoming parallel channel and an outgoing parallel channel interfaced with a second said parallel channel external device, each said end of said logic system being equipped with a serialization means for serializing into serial form bytes of parallel channel digital data signals incoming to said logic system, a transmission means for transmitting the serial form of incoming parallel digital data signals to the other end of said logic system, and a converting means for converting serial form digital data signals transmitted thereto from the other end of said logic system into parallel form, said logic system being further characterized by the fact that it consists of said first and second ends opposite each other and transmission media linking said ends together, and by the fact that features of said ends include:

mode setting means within the first end for effecting the formation of distictive mode digital signals for each different digital data message handling mode of said logic system, there being more than one possible said message handling mode for said entire logic system, one being termed a first said message handling mode, and another being termed a second said message handling mode, said first message handling mode being the normal message handling mode for said entire logic system, said mode setting means including a means for establishing at least said second message handling mode by combining signals from predetermined locations in a parallel byte of digital data signal incoming to said first end from said first external device, means for including said mode digital signals in a transmission by said first end transmission means to said second end, decoding means within said second end for processing said mode digital signals transmitted to said second end so as to effect the formation of signals for conforming said second end to the message handling mode set by said first end, buffer means within the second end, effectively placed in operation only under said second message handling mode, for temporarily storing a predetermined type of digital data signals transmitted to said second end from said first end, monitoring means within the first end, effectively placed in operation only under said second message handling mode, for monitoring the availability of digital data signal storage space in said buffer means at said second end, and facilitating means within the first end, effectively placed in operation under said second message handling mode, for generating within said first end a return signal or signals from a portion of the parallel channel digital data signals incoming from the first external device and for returning said return signal or signals back to said first external device to facilitate further output of parallel channel digital data signals by said first external device during the times said monitoring means indicates said buffer means has storage space available.

2. The system of claim 1 additionally including reply means selectively operable within the second end of said logic system at the time said second end is conformed to said second message handling mode, for generating a reply transmission back to the first end of said logic system from a selected portion of the transmission effecting said conformance of said second end to said second message handling mode, and means within said first end of said logic system for generating from said reply transmission a digital message for said first external device.

3. The system of claim 1 additionally including comparator means at each end of said logic system, operable under said first message handling mode, actuated solely by a change in the digital data of one byte of incoming parallel signals as compared to the digital data of an immediately preceding incoming byte of parallel signals, for initiating transmission by the transmission means of the end.

4. The system of claim 3 including, at each said end of said logic system, a means for clocking each byte of incoming parallel signals by a clock pulse, and wherein said comparator means compares the digital data of incoming bytes of parallel signals on one clock pulse apart.

5. The system of claim 1 wherein said digital data signals of said second message handling mode comprise WRITE data, and wherein said serialization means at said first end operates in said second message handling mode to serialize incoming bytes of parallel digital data signals on a predetermined number less than all of the lines of the incoming parallel channel interfaced with the first external device.

6. The logic system of claim 5 including means for generating at the second end any control signals required by said second external device for acceptance of digital data signals transmitted to said second end without said control signals, said generating means being actuated by digital data signals incoming from said second external device.

7. The logic system of claim 1 including means within said second end for generating in said second end a selected external device control signal or signals for predetermined location with parallel digital data signals serially transmitted thereto by the first end without said selected control signal or signals.

8. The logic system of claim 1 including means selectively operable within the second end for employing selected signals incoming from said second external device to generate a signal or signals back to said second external device to thereby cause said second external device to release or accept digital data signals.

9. The logic system of claim 1 including means within said second end, effectively placed in operation under said second message handling mode, for employing a selected signal or signals from said second external device to generate a transmission back to said first end monitoring means each time said second external device removes digital data signals from said buffer means.

10. The logic system of claim 1 wherein said mode digital signals consist of no more than two bits.

11. The logic system of claim 1 including means at each end, actuated solely by parallel channel digital data incoming from the external device interfaced with the end, for initiating serialization by the serialization means of the end.

12. The system of claim 1 including means within the second end, effectively placed in operation during said second message handling mode, for postponing conformance of said second end to a message handling mode different from said second message handling mode until said second external device has removed temporarily stored digital data signals from said buffer means or detects an error.

13. The logic system of claim 1 additionally including means at the second end, effectively placed in operation under said second message handling mode, for employing signals incoming from the second external device as the sole actuator for effecting movement of digital data signals out of said buffer means of said second end to said second external device.

14. A logic system for transferring digital data between parallel channel digital data external devices, said logic system having a first end equipped with an incoming parallel channel and an outgoing parallel channel interfaced with a first said parallel channel external device, and a second end equipped with an incoming parallel channel and an outgoing parallel channel interfaced with a second said parallel channel external device, each end of said logic system being equipped with a serialization means for serializing into serial form bytes of parallel digital data signals incoming to said logic system, a transmission means for transmitting the serial form of incoming parallel digital data signals to the other end of said logic system, a converting means for converting serial form digital data signals transmitted thereto from the other end of said logic system into parallel form, and a clock means for clocking control of the movement of incoming bytes of parallel digital data signals by a clock pulse, said logic system being further characterized by the fact that it consists of said first and second ends opposite each other and transmission media linking said ends together, and by the fact that said first end includes means for establishing more than one possible message handling mode for said logic system, and by the fact that each end of said logic system includes a comparator means operable under at least one message handling mode of said logic system to generate a pulse which initiates both serialization of incoming parallel digital data signals into serial form by the serialization means of the end and the transmission of said serial form digital data signals by the transmission means of the end, said comparator pulse being generated when a change of digital data between incoming bytes of parallel digital data signals of one clock pulse apart is detected by said comparator means, there being no means at either end of said logic system for temporary buffer storage of *more than one parallel group of* incoming parallel digital data signals from an external device before serializing and transmitting the same to the other end.

15. The system of claim 14 additionally including means in at least one end, operable under at least one message handling mode, for generating a return signal or signals from a portion of the parallel signals incoming to the logic system from the external device interfaced with said end, and means for returning said return signal or signals back to said external device at said end to facilitate further release or acceptance of digital data by said external device at said end.

16. The system of claim 14 including means for causing said serialization means at said first end to operate under one of said message handling modes so as to serialize incoming bytes of digital data signals on a predetermined number less than all of the lines of the incoming parallel channel interfaced with the first external device.

17. The logic system of claim 14 including means within said second end for generating in said second end a selected external device control signal or signals for predetermined location with parallel digital data signals serially transmitted thereto by the first end without said selected control signal or signals.

18. The logic system of claim 14 additionally including means at the second end, effectively placed in operation under at least one said message handling mode, for employing signals incoming from said second external device as the sole actuator for effecting movement of digital data signals from said second end of said logic system into said second external device.

19. A logic system for transferring digital data between parallel channel digital data external devices said logic system having a first end equipped with an incoming parallel channel and outgoing parallel channel interfaced with a first said parallel channel external device, and a second end equipped with an incoming parallel channel and outgoing parallel channel interfaced with a second said parallel channel external device, each said end of said logic system being equipped with a serialization means for serializing into serial form bytes of parallel channel digital data signals incoming to said logic system, a transmission means for transmitting the serial form of incoming parallel digital data signals to the other end of said logic system, and a converting means for converting serial form digital data signals transmitted thereto from the other end of said logic system into parallel form, said logic system being further characterized by the fact that its consists of said first and second ends opposite each other and transmission media linking said ends together, and by the fact that features of said first end include:

mode setting means for establishing the digital data message handling mode for said entire logic system, there being at least a first and second said message handling mode for said entire logic system, said mode setting means including a means of for combining signals from predetermined locations in a parallel byte of digital signals incoming to said first end from said first external device to form signals for establishing at least the second of said message handling modes, and facilitating means selectively operable within the first end for generating within said first end a return signal or signals from a portion of the parallel channel digital data signals incoming from the first external device and for returning said return signal or signals back to said first external device to facilitate further output of parallel channel digital data signals by said first external device, said facilitating means being inoperable under said first message handling mode but effectively placed in operation under at least said second message handling mode.

20. A logic system for transferring digital data between parallel channel digital data external devices, said logic system having a first end equipped with an incoming parallel channel and an outgoing parallel channel interfaced with a first said parallel channel external device, and a second end equipped with an incoming parallel channel and an outgoing parallel channel interfaced with a second said parallel channel external device, each end of said logic system being equipped with a serialization means for serializing into serial form bytes of parallel channel digital data signals incoming to said logic system, a transmission means for transmitting the serial form of incoming parallel digital data signals to the other end of said logic system, and a converting means for converting serial form digital data signals transmitted thereto from the other end of said logic system into parallel form, said logic system being further characterized by the fact that is consists of said first and second ends opposite each other and transmission media linking said ends together, there being no means at either end of said logic system for temporary buffer storage of *more than one parallel group of* incoming parallel signals from an external device before serializing and transmitting the same to the other end, said logic system additionally including means in said first end for establishing for said logic system a message handling mode in which said serialization means at said first end operates to serialize incoming bytes of parallel digital data signals on a predetermined channel interfaced with said first external device.

*21. A logic system for transferring digital data between parallel channel digital data external devices, said logic system having a first end equipped with an incoming parallel channel and outgoing parallel channel interfaced with a first said parallel channel external device, and a second end equipped with an incoming parallel channel and outgoing parallel channel interfaced with a second said parallel channel external device, each said end of said logic system being equipped with a serialization means for serializing into serial form bytes of parallel channel digital data signals incoming to said logic system, a transmission means for transmitting the serial form of incoming parallel digital data signals to the other end of said logic system, and a converting means for converting serial form digital data signals transmitted thereto from the other end of said logic system into parallel form, said logic system being further characterized by the fact that it consists of said first and second ends opposite each other and transmission media linking said ends together, and by the fact that features of said first end include:*

*mode setting means for establishing the digital data message handling mode for said entire logic system, there being at least a first and second said message handling mode for said entire logic system, said first mode being a random message handling mode and said second mode being a WRITE message handling mode, and*

*facilitating means selectively operable within the first end for generating within said first end a return signal or signals from a portion of the parallel channel digital data signals incoming from the first external device and for returning said return signal or signals back to said first external device to facilitate further output of parallel channel digital data signals by said first external device, said facilitating means being inoperable under said first message handling mode but effectively placed in operation under at least said second message handling mode.*

*22. The logic system of claim 21 having a computer device as said first parallel channel external device and a peripheral device as said second parallel channel external device, and further characterized by the following features:*

*said second end includes buffer means for temporarily storing WRITE bytes of digital signals transmitted to said second end from said first end under said second message handling mode, and*

*said first message handling mode being one wherein digital signals other than for READ or WRITE incoming from either the computer or the peripheral device are transmitted through said logic system and received by the other said device before the receiving said device releases digital signals for transmission through said logic system to the other said device.*

*23. The logic system of claim 22 additionally including turn back means within the second end for employing digital signals incoming from the peripheral device as the actuator for effecting successive movement of WRITE bytes of digital signals out of said buffer means of said second end on a first in/first out basis to said peripheral device, and means for by-passing said turn back means during said first message handling mode.*

*24. The logic system of claim 22 additionally including:*

*monitoring means within the first end for monitoring the availability of storage space in said buffer means, and*

*means within said second end for employing a signal or signals from said peripheral device to generate a transmission back to said first end monitoring means responsively to removal of WRITE bytes from said buffer means by said peripheral device, and*

*said transmission media linking said ends together effectively permits concurrent transmission of serialized digital signals from each end to the other.*

*25. A logic system for transferring digital data between parallel channel digital data computer and peripheral end devices, said logic system having a first end equipped with an incoming parallel channel and an outgoing parallel channel interfaced with a parallel channel computer end device, a second end equipped with an incoming parallel*

*channel and an outgoing parallel channel interfaced with a parallel channel peripheral end device, and transmission media linking said ends together, each said end of said logic system being equipped with a serialization means for serializing into serial form bytes of parallel channel digital data signals incoming to said logic system, a transmission means for transmitting the serial form of incoming parallel digital data signals to the other end of said logic system, and a converting means for converting serial form digital data signals transmitted thereto from the other end of said logic system into parallel form, said logic system being further characterized by the following features:*

*buffer means within the second end for temporarily storing WRITE bytes of digital signals transmitted to said second end from said first end,*

*monitoring means within the first end for monitoring the availability of storage space for WRITE bytes in said buffer means at said second end,*

*facilitating means within the first end, operable during times of transmitting WRITE bytes from said first end to said second end, for generating within said first end a return signal or signals from a portion of the parallel channel digital data signals incoming from the computer end device and for returning said return signal or signals back to said computer end device to facilitate further output of WRITE bytes of digital signals by said computer end device during the times said monitoring means indicates said buffer means has storage space available,*

*means for establishing a random message handling mode for said logic system wherein said facilitating means is by-passed and wherein digital signals other than for READ or WRITE incoming from either the computer or the peripheral end device are transmitted through said logic system and received by the other end device before the receiving end device releases digital signals for transmission through said logic system to the other end device, and*

*said transmission media linking said ends together effectively permits concurrent transmission of serialized digital signals from each end to the other.*

*26. The logic system of claim 25 additionally including:*

*means within said second end for employing a signal or signals from said peripheral device to generate a transmission back to said first end monitoring means responsively to removal of WRITE bytes from said buffer means by aid peripheral device.*

*27. A process for communicating parallel digital signals between a parallel channel computer device and a parallel channel peripheral device, wherein each said device is interfaced at a parallel channel with a parallel channel end unit of a logic system interposed between said devices, and wherein each end unit of the logic system includes means for serializing parallel digital signals incoming to the logic system from the device interfaced therewith, means for transmitting such serialized digital signals to the other end unit of the logic system, and means for converting the serialized digital signals received thereat into parallel form, and wherein said end unit of said logic system interfaced with said peripheral device includes buffer means for temporarily storing digital signals transmitted through said logic system to said end unit interfaced with said peripheral device, and wherein said end unit interfaced with said computer device includes monitoring means for monitoring the availability of storage space in said buffer means of said end unit interfaced with said peripheral device, and wherein said end unit interfaced with said computer device includes facilitating means for generating within said end unit a return signal or signals from incoming digital signals from the computer and for returning the return signal or signals back to the computer to facilitate output of further digital signals by the computer, comprising:*

*passing digital signals of random communication other than digital signals of WRITE or READ bytes through said logic system between said devices in a manner such that the random communication digital signals from one said device to the other said device are received by the other said device before further digital signals are passed through said logic system between said devices, and*

*passing digital signals of WRITE bytes of communication from the computer device to the end unit interfaced with the peripheral device into temporary storage in said buffer means while sending to the computer the return signal or signals generated by said facilitating means for so long as said monitoring means indicates space to be available in said buffer means.*

*28. The process of claim 27 additionally including the step of removing WRITE bytes from said buffer means by said peripheral device by generating from an incoming digital signal or signals from said peripheral device any control signal or signals required by said peripheral device for acceptance of WRITE bytes from said buffer means, and returning said control signal or signals back to said peripheral device.*

*29. The process of claim 27 additionally including the step of generating a transmission back to said first end unit monitoring means from said end unit interfaced with said peripheral device responsively to removal of WRITE bytes from said buffer means.*

*30. The process of claim 27 additionally including the step of limiting the operation of said serialization means of said end unit interfaced with the computer device so as to serialize digital signals on a predetermined number less than all of the lines of the incoming parallel channel interfaced with said computer device.*

*31. The process of claim 27 additionally including the step of temporary latch storage of incoming parallel digital signals from said computer before serializing the same.*

*32. The process of claim 27 additionally including the step of sending digital signals of READ bytes of communication from the peripheral device to the end unit interfaced with the computer device while generating from the READ bytes from said peripheral device any control signal or signals required by said peripheral device for release of READ bytes, and returning said control signal or signals back to said peripheral device.*

*33. The process of claim 27 wherein serialized WRITE bytes are converted into parallel form at said end unit interfaced with said peripheral device prior to temporary storage of the same in said buffer means.*

*34. The process of claim 27 including the step of passing WRITE bytes from said buffer means on a first in/first out basis to said peripheral device.*

* * * * *